Dec. 8, 1936.  H. T. LAMBERT  2,063,443
BRAKE MECHANISM
Filed March 19, 1934  10 Sheets-Sheet 1

Inventor:
Homer T. Lambert,
Edgar M. Kitchin,
By
His Attorney.

Dec. 8, 1936.  H. T. LAMBERT  2,063,443
BRAKE MECHANISM
Filed March 19, 1934  10 Sheets-Sheet 2
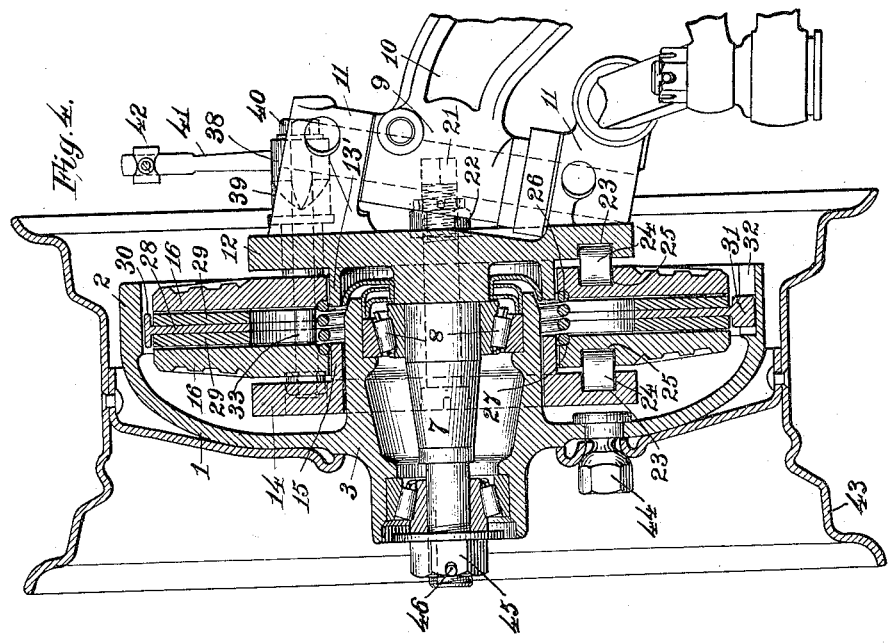
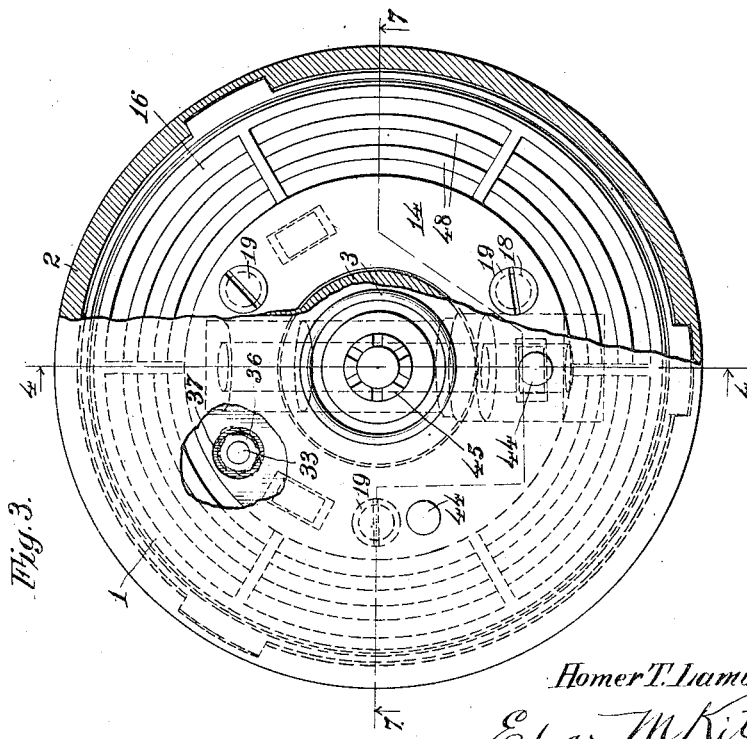
Inventor:
Homer T. Lambert,
Edgar M. Kitchin,
By
his Attorney.

Dec. 8, 1936.                H. T. LAMBERT                2,063,443
                            BRAKE MECHANISM
                    Filed March 19, 1934        10 Sheets-Sheet 3
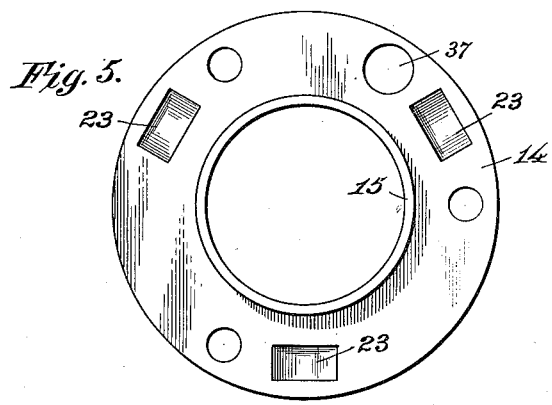
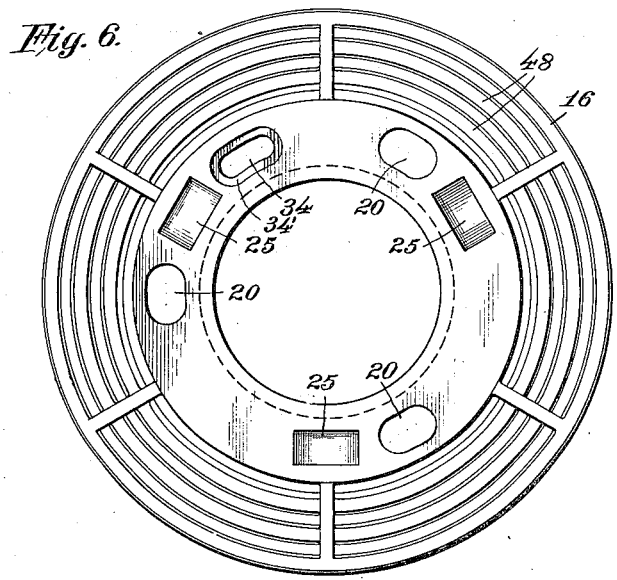
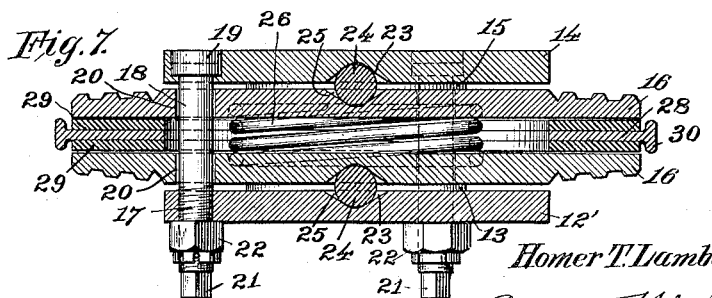
Inventor:
Homer T. Lambert,
Edgar M. Kitchin,
By
his Attorney.

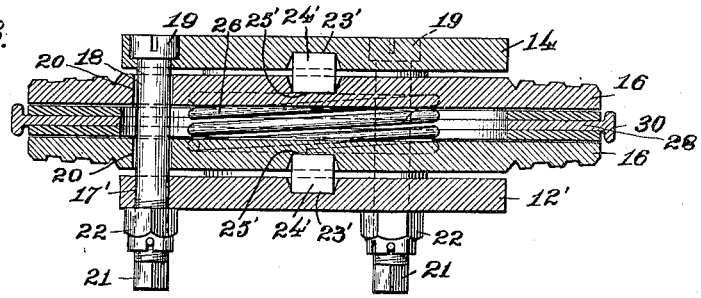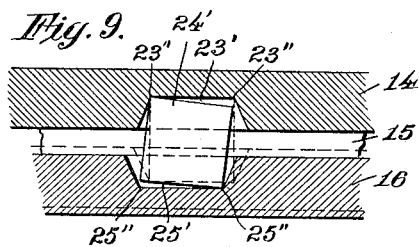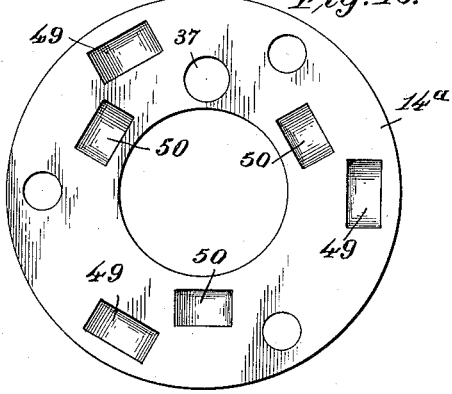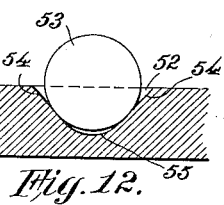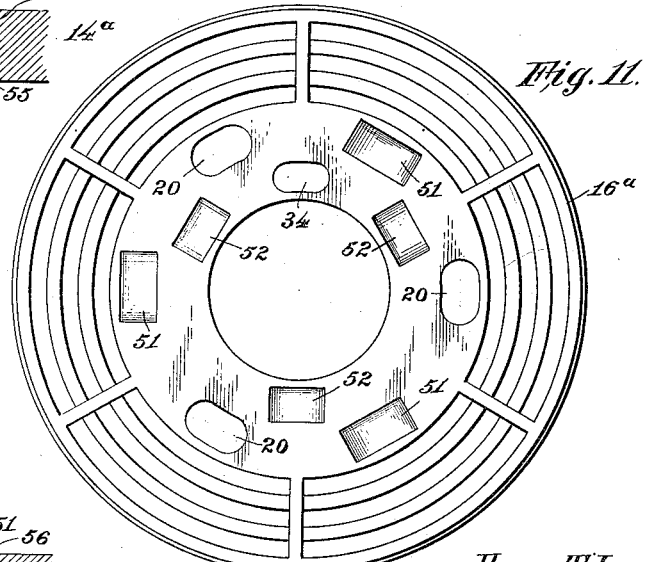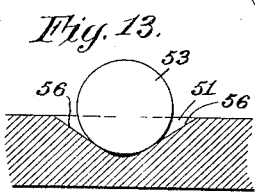

Dec. 8, 1936.  H. T. LAMBERT  2,063,443
BRAKE MECHANISM
Filed March 19, 1934   10 Sheets-Sheet 5
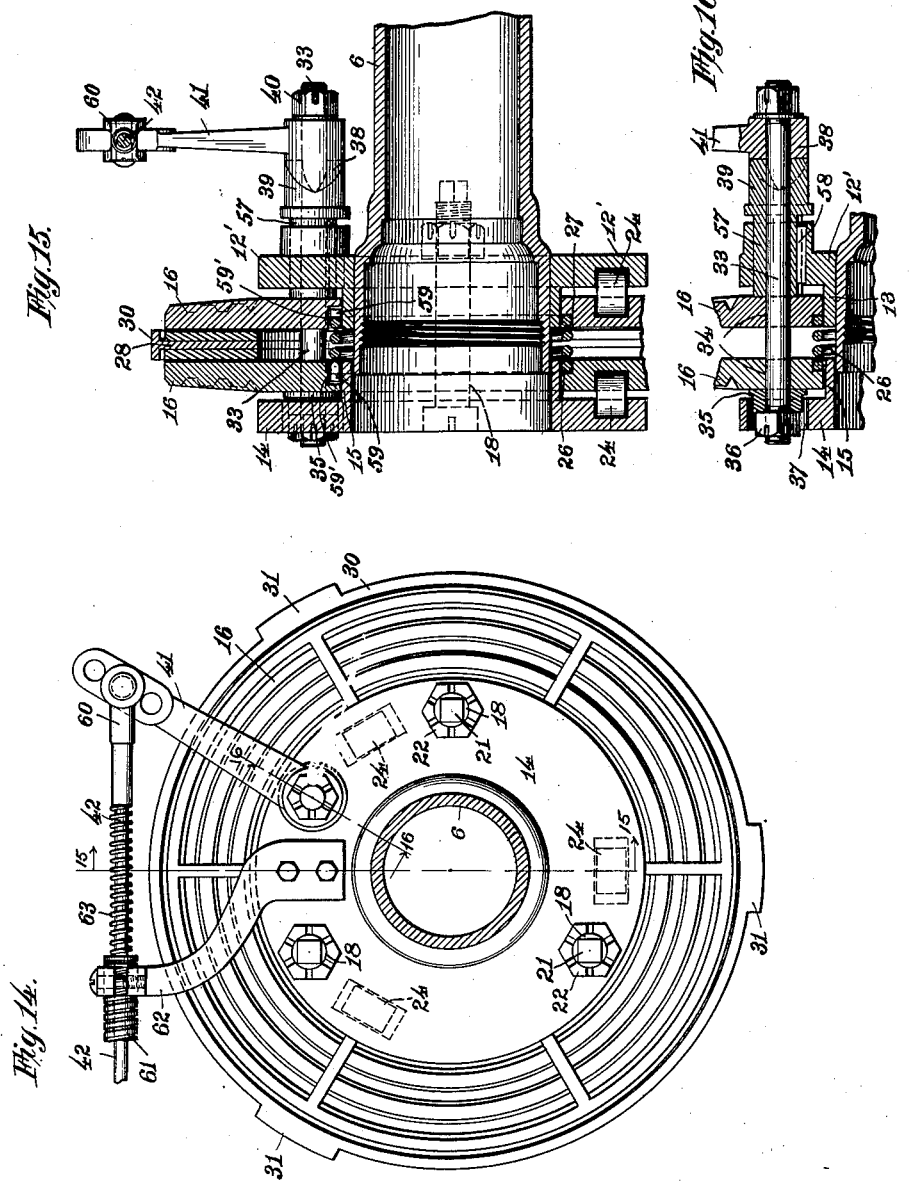
Inventor:
Homer T. Lambert,
By Edgar M. Kitchin
His Attorney.

Dec. 8, 1936. H. T. LAMBERT 2,063,443
BRAKE MECHANISM
Filed March 19, 1934   10 Sheets-Sheet 6
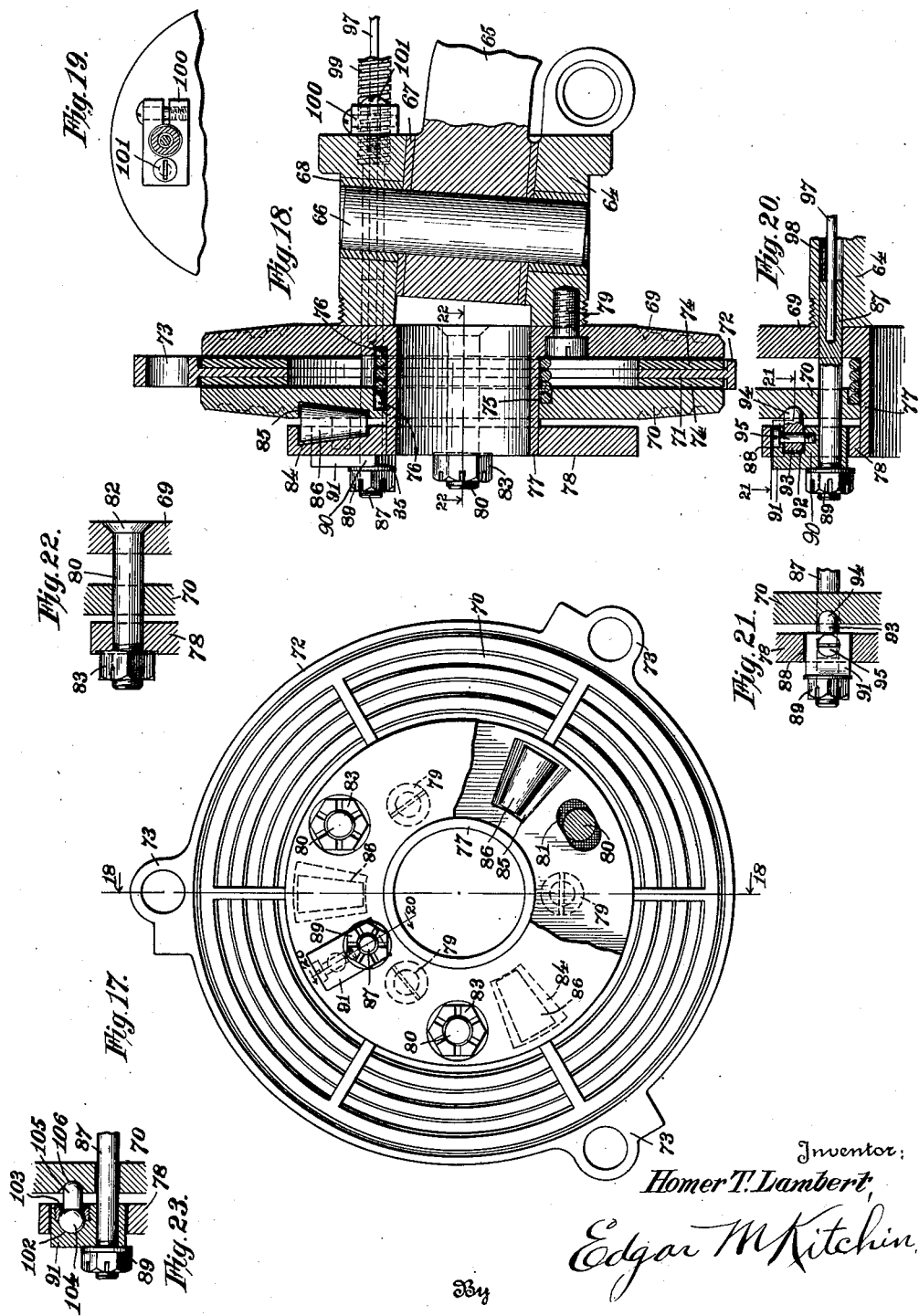
Inventor:
Homer T. Lambert,
Edgar M Kitchin
By
his Attorney.

Dec. 8, 1936.  H. T. LAMBERT  2,063,443
BRAKE MECHANISM
Filed March 19, 1934   10 Sheets-Sheet 8
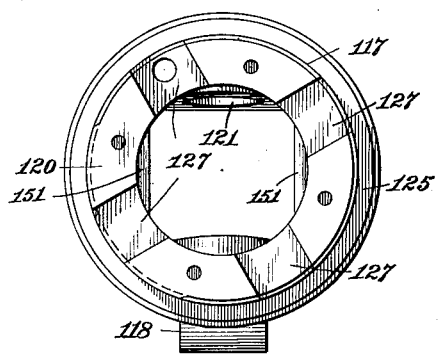
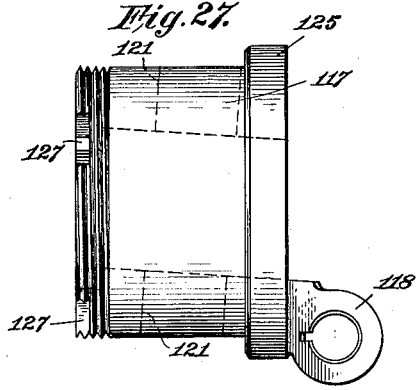
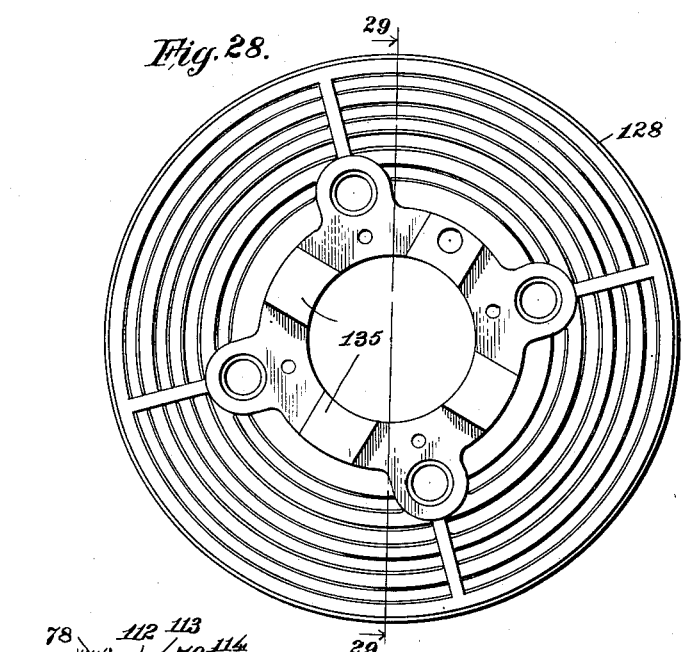
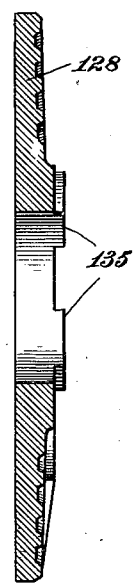
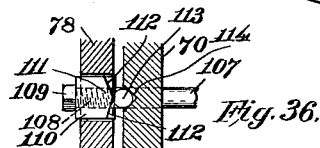
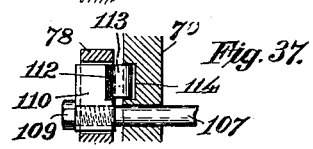
Inventor:
Homer T. Lambert,
Edgar M. Kitchin,
By
his Attorney

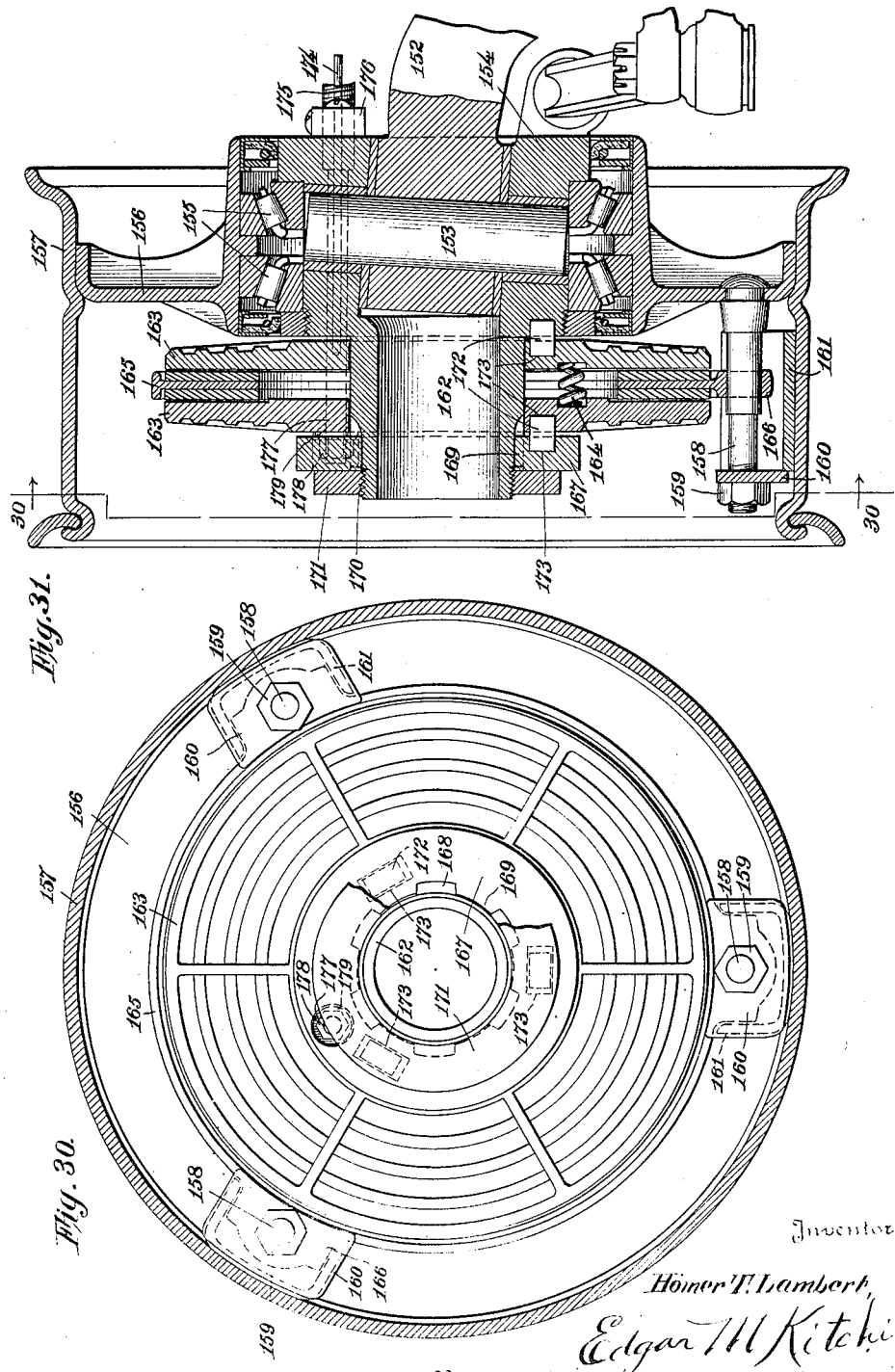

Dec. 8, 1936.  H. T. LAMBERT  2,063,443
BRAKE MECHANISM
Filed March 19, 1934  10 Sheets-Sheet 10
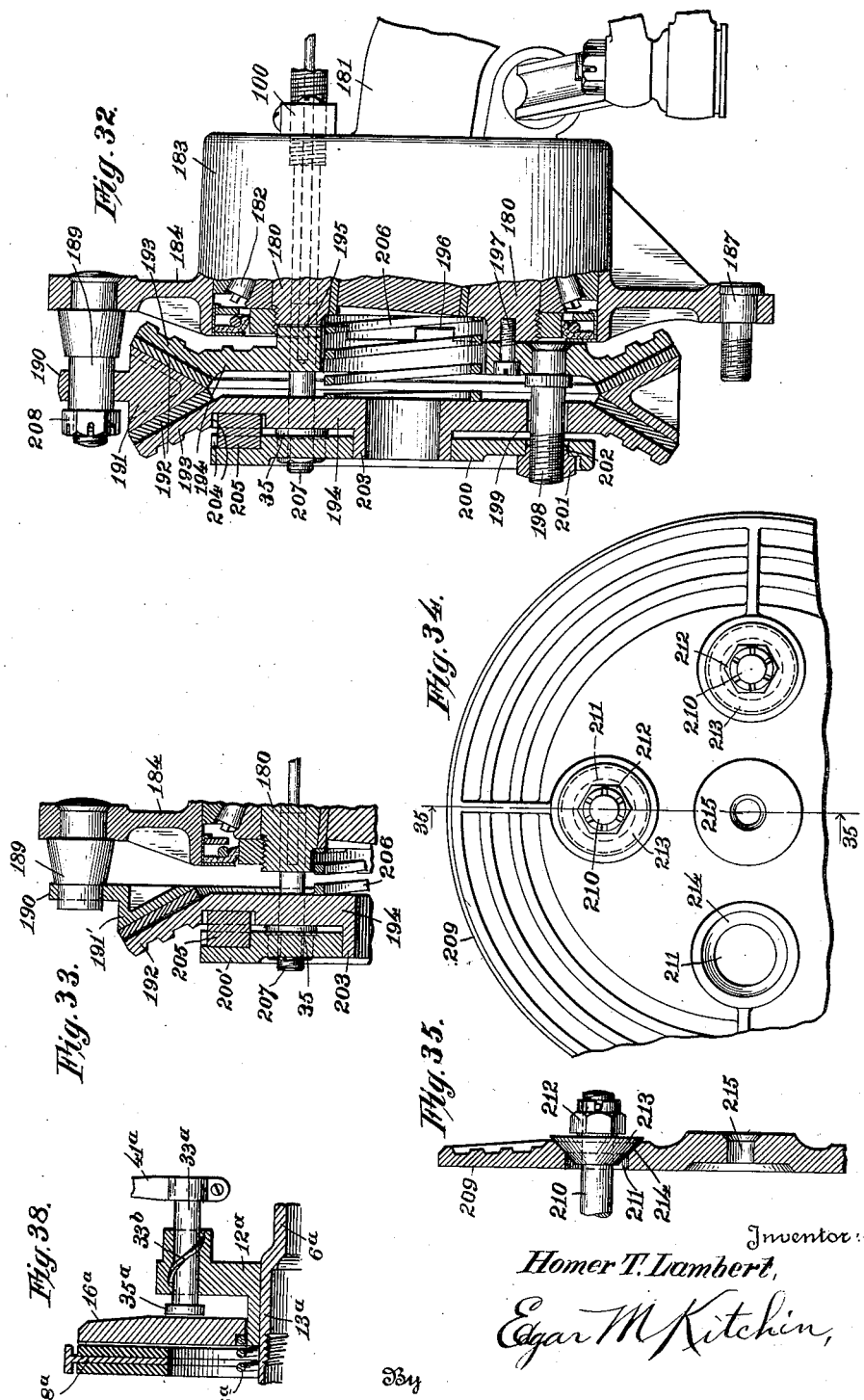

Patented Dec. 8, 1936

2,063,443

UNITED STATES PATENT OFFICE 2,063,443

BRAKE MECHANISM

Homer T. Lambert, St. Joseph, Mich.

Application March 19, 1934, Serial No. 716,401

20 Claims. (Cl. 188—72)

This invention relates to improvements in power transmission and control apparatus, such as brakes, and has as a characterizing object the transfer of power under conditions whereby the direct engagement of the power-transferring elements acts to render more efficient the process of power transference.

Another important object is the utilizing of the momentum of the power delivery element to supplement the force of a primary application of power transfer.

A further object is dependable assurance of momentum-accentuated power delivery.

It is also an object of the present invention to afford nicety of application and control of the supplementing power, and it is a further object to insure release instantly and effectively when the engagement between the relatively movable parts is no longer desired.

A further object is the provision of details of a brake construction insuring a braking capacity vastly in excess of that normally represented by the force required for initial application of the brake.

A still further object is the release of the engagement of the braking parts after such an application with assured promptitude and effectiveness, avoiding any residual resistance or drag.

Another object is the effective distribution of power between relatively movable parts for checking or accelerating such movement regardless of the direction of such movement.

A more detailed object is the obtaining of all of these advantages in a structure lending itself readily to application to vehicle wheels, and a further object is the ready adaptability thereof for use on all of the wheels of a vehicle, such as an automobile.

Other objects will become in part obvious and in part be stated hereinafter.

The invention comprises certain novel constructions, combinations, and arrangements of parts in a power transmission apparatus, such as a clutch or brake, wherein provision is made for vastly increasing the force when and as required applied to the cooperating parts of such a power transmission apparatus beyond that and incident to that of the initial application of power.

The invention also includes provision in connection with power transmission elements of means for advancing said elements toward power transmitting engagement incident to such engagement.

The invention also includes parts, one of which is movable relative to the other and is destined either to carry said other with itself when brought into engagement or to be retarded in its movement by such other, means for moving the relatively movable parts into engagement, means actuated by the movement of said parts for increasing the force of their engagement, and means controlling the application and release of such excess force.

The invention further includes such a combination in which means are provided to enable the control and actuation to be effective regardless of the direction of movement of the moving part.

The invention also comprises certain other novel constructions, combinations, and arrangements of parts and details of construction as hereinafter specified and claimed.

In the accompanying drawings,—

Figure 3 is a sectional elevation similar to Figure 1 with the wheel omitted and parts of the hub structure shown in section, the invention being illustrated as applied to the front or dirigible wheel of an automobile.

Figure 4 is a vertical, axial section through such front wheel and the parts seen in Figure 3, parts being seen in elevation, the section being taken approximately on the plane indicated by line 4—4 of Figure 3.

Figure 5 is a view in side elevation of the energizing plate detached.

Figure 6 is a similar view of one of the brake discs.

Figure 7 is a horizontal section taken on the planes indicated by line 7—7 of Figure 3, and looking upward.

Figure 8 is a view similar to Figure 7 of a slightly modified embodiment.

Figure 9 is an enlarged, detailed, fragmentary sectional elevation showing one of the energizing blocks in action.

Figure 10 is a view similar to Figure 5 of an energizing plate having the pockets or recesses for two sets of energizing levers.

Figure 11 is a view similar to Figure 6 of a brake disc modified therefrom to correspond with the energizing plate of Figure 10.

Figure 12 is an enlarged, vertical section through a fragment of an energizing plate or of a brake disc (the two being identical at this place) showing a roller as the wedging element in its recess, and indicating the angle of the terminal surfaces of such recess as relatively high, such as is preferred for the inner set of recesses.

Figure 13 is a similar view of a fragment of an energizing plate or brake disc showing one of the energizing roller levers and its recess with relatively lower angle of terminal surfaces incident to the fact that the recess is of the outer series.

Figure 14 is a view in side elevation of a modified form of the invention applied to the power wheel or rear wheel of an automobile, with the wheel omitted, and the dead axle seen in section.

Figure 15 is a fragmentary, vertical section taken on the plane indicated by line 15—15 of Figure 14, parts being seen in elevation.

Figure 16 is a fragmentary, vertical section taken longitudinally of the prime actuator for the brake, the section being taken on the plane indicated by line 16—16 of Figure 14, the prime actuator bolt or rod being seen in elevation.

Figure 17 is a view similar to Figure 1 of another modified embodiment applied to the dirigible wheel of an automobile.

Figure 18 is a vertical section therethrough taken on the plane indicated by line 18—18 of Figure 17.

Figure 19 is a fragmentary elevation showing the control wire and its armor in cross section.

Figure 20 is a detailed fragmentary section taken on the plane indicated by line 20—20 of Figure 17.

Figure 21 is a detailed fragmentary section taken on the plane indicated by line 21—21 of Figure 20, parts being seen in plan.

Figure 22 is a detailed fragmentary, horizontal section taken on the plane indicated by line 22—22 of Figure 18, parts being seen in plan.

Figure 23 is a detailed fragmentary section similar to Figure 20 of a modified embodiment, parts being seen in elevation.

Figure 2:
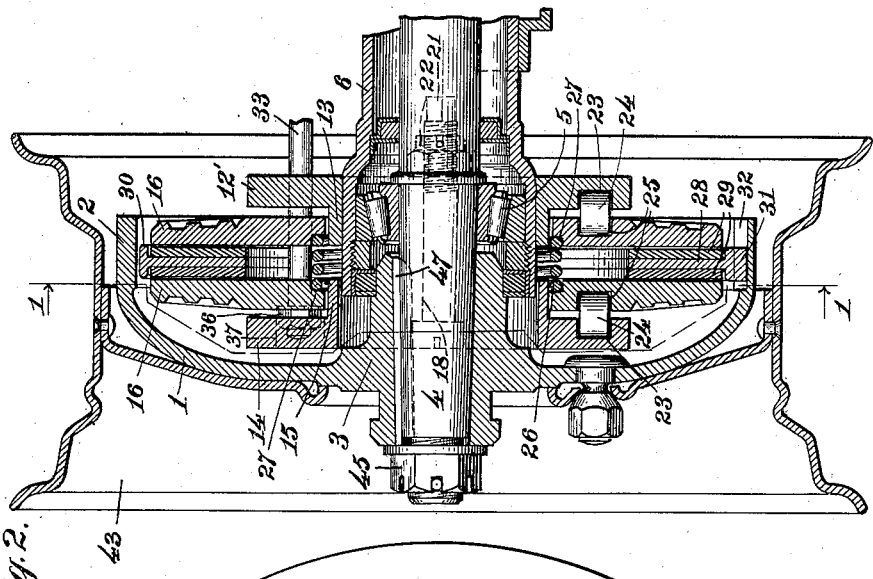
Figure 2 is a vertical section in the plane of the axis of rotation as indicated by line 2—2 of Figure 1, parts being seen in elevation.
Figure 1:
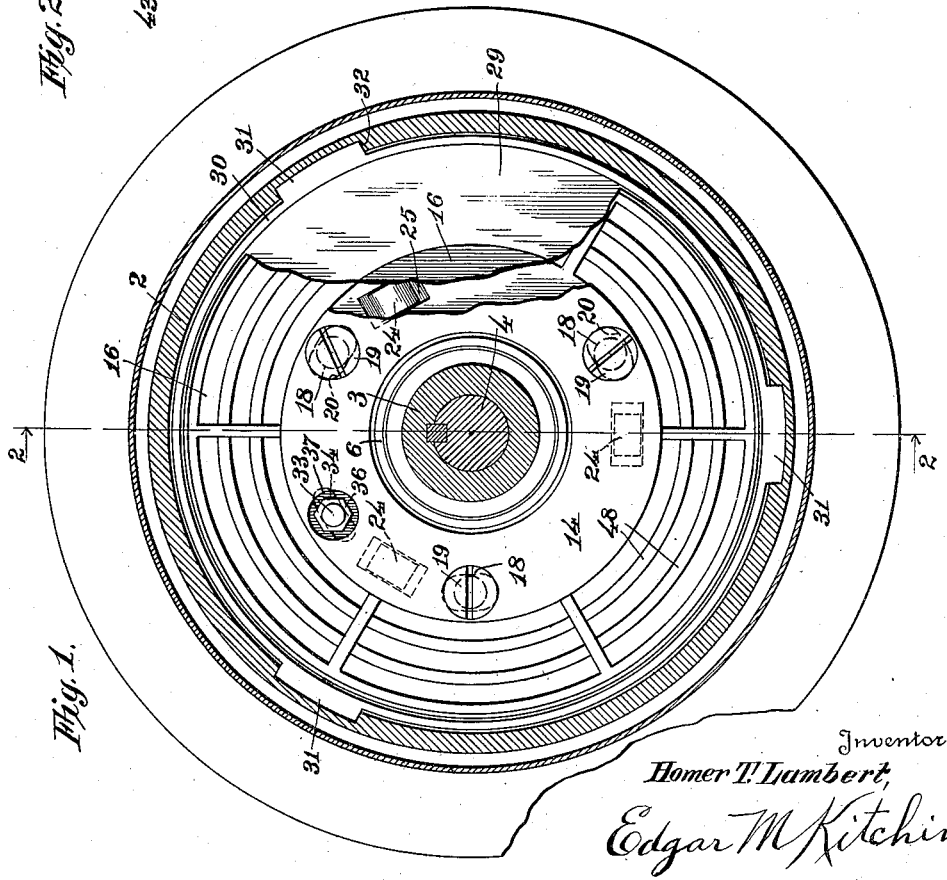
Figure 1 is a vertical section taken approximately on the planes indicated by line 1—1 of Figure 2 through a structure embodying the present invention, parts being seen in elevation and parts being broken away to disclose structures in the rear, and the invention being shown as applied to the rear or driving wheel of an automobile.
Figures 24, 25:
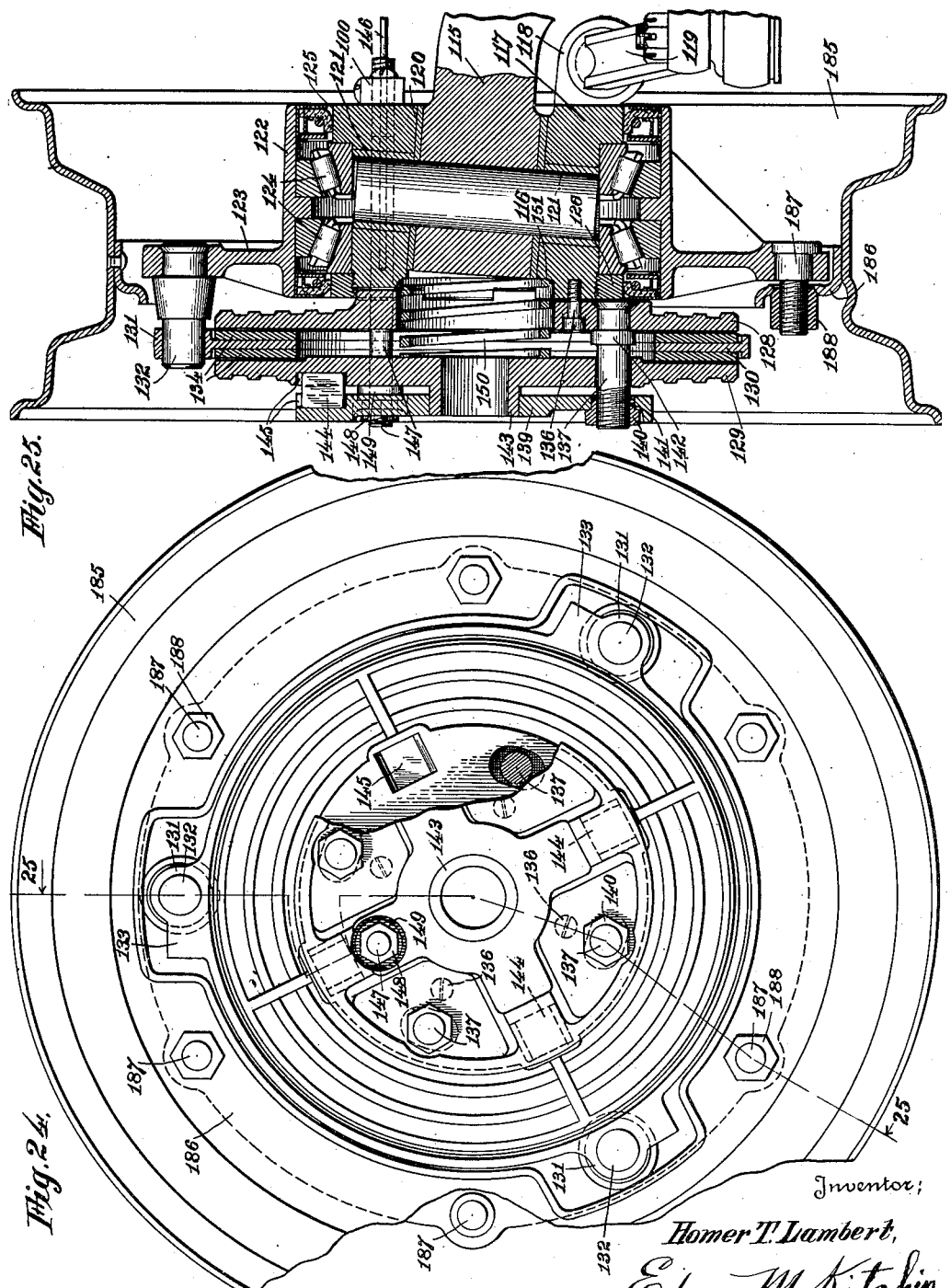

Figures 24 and 25 are views similar to Figures 1 and 2 respectively of a further embodiment of the invention as applied to a dirigible wheel, Figure 25 being taken on the planes indicated by line 25—25 of Figure 24.

Figure 26 is an end elevation looking from the outside, and Figure 27 is a side elevation of the pivoted, non-rotating hub of the structures seen in Figures 24 and 25, the hub being seen detached.

Figure 28 is a view in side elevation looking from the inside and disclosing the hub-cooperating-face of the inner braking disc detached of the structures seen in Figures 24 and 25.

Figure 29 is a vertical section taken on the plane indicated by line 29—29 of Figure 28.

Figures 30 and 31 are views respectively similar to Figures 24 and 25 of a further embodiment, the demountable rim being shown in section in Figure 30, and the section being taken approximately on the planes indicated by line 30—30 of Figure 31.

Figure 32 is a fragmentary, vertical section through the hub and brake structure of a dirigible wheel incorporating a further embodiment of the inventions, parts being seen in elevation.

Figure 33 is a fragmentary view similar to the section seen in Figure 32, parts being broken away for the saving of space, and the structure incorporating a modified embodiment of the invention.

Figure 34 is a fragmentary elevation of a brake disc detached, and cooperating prime actuators, parts being omitted, and the structure incorporating a modified embodiment of the invention as applied to a dirigible wheel.

Figure 35 is a vertical section taken on the plane indicated by line 35—35 of Figure 34.

Figure 36 is a fragmentary, horizontal section through a brake disc and energizing plate embodying the features of the present invention, and showing the prime actuator in modified form in plan.

Figure 37 is a side elevation of the prime actuator detached as seen in Figure 36.

Figure 38 is a view similar to Figure 33 of a further embodiment of the invention.

The transfer and control of power is achieved by largely similar apparatus whether the power be delivered for use or for absorption, it being well known that the transfer and control of power whether accomplished through a brake or a clutch requires utilization of largely similar instrumentalities and operations, so that it will be readily understood that the present invention is equally well adapted for clutch structures as for braking structures, and that though the invention is specifically illustrated in the accompanying drawings and hereinafter described in detail with respect to brakes, it is equally applicable to clutches, and the terminology of the appended claims should be accordingly interpreted. Accordingly, wherever applicable, the use of the term "brake" is intended to be inclusive.

It has heretofore been proposed to utilize the momentum of a rotating part, such as a drum or wheel, to provide the force of application of power transfer elements, such as braking parts, but difficulty has been experienced in directing and controlling such force to avoid violent suddenness and undue shock and strain of application, and to avoid unintended delay of release or premature release.

Among the other objects in view, the present invention avoids these difficulties and provides for a successful and highly efficient and effectively controlled gradual application, which, while gradual and smooth, is susceptible of sufficiently quick action as to accomplish the results desired in minimum time, yet without shock, jar, jolt or jerk. The present invention also assures either instant or gradual release as required and desired.

The invention is applicable to a wide range of usage and to extensive modification in details of construction, a few selected embodiments being specifically set forth hereinafter as illustrative of preferred constructions, and for facility of disclosure the constructions are shown as applied to automobile wheels, though, of course, they are readily applicable to any similarly rotating part.

The invention is applicable to all sorts of wheels and drums whether rotating about a fixed axis or mounted to swivel as well as rotate, and is illustratively disclosed in Figures 1 and 2 of the drawings as applied to the former type, such as the rear wheels of automobiles, and illustratively disclosed in Figures 3 and 4 as applied to the latter type, such as the dirigible or front wheels of automobiles.

The embodiment is the same whether applied to one or the other type of wheel, and the same reference numerals therefore are used throughout Figures 1 to 7 inclusive for identical parts, differentiation being made only with respect to those parts relating to the particular type of wheel. A drum 1 having a cylindrical portion 2 is fixed to and preferably formed integral with an appropriate hub 3. The hub 3, in the instance of a non-swiveled wheel, is keyed to the drive shaft 4, or otherwise fixed thereto, for receiving power, the shaft being journaled at 5 on and within the fixed axle 6. With the swiveled type of wheel, the stub axle 7 extends through and provides support for the journal bearings 8, 8, for the hub 3, the stub axle being itself swiveled by an appropriate king pin to the terminal sleeve 9 of the front axle 10, the king pin or pintle connecting the stub axle with the sleeve 9 extending through eyes 11, 11, rigidly connected with the stub axle through a plate 12 which, because of its function additional to carrying the eyes 11, will be referred to as an energizing plate. A similar energizing plate 12' is provided for the braking structure in the wheel construction of Figures 1 and 2, the parts of the braking structure of Figures 1 and 2 being otherwise identical with the braking structure of Figures 3 and 4. The plate 12' is rigidly anchored to the outer portion of the rigid axle 6, as by having a driven fit thereon, or sweated or shrunk thereon, or by being otherwise fixed thereto as desired. Plate 12' has an outwardly extending elongated boss or sleeve 13, and the plate 12 has a similar elongated boss or outstanding sleeve 13' corresponding in form and function with the sleeve 13.

Spaced outwardly from the plate 12 or 12' is a cooperating energizing plate 14 having an inwardly-extending sleeve 15 and between the plates 14 and 12' on the one hand, and 14 and 12 on the other, are the brake discs 16, 16, spaced apart and surrounding the respective sleeves 15 and 13 or 13'. Interposed between the plates 16 and stressed to expand is a spring 26 which is preferably coiled and tensioned to keep the plates 16 separated. The discs 16 are free to float in an axial direction toward and away from each other subject to the expanding pressure of the spring 26, but are held against more than a limited rotative movement by operative connection hereinafter described with the non-rotating energizing plates 12 and 14 or 12' and 14. Spring 26 has its ends preferably seated in circular rabbets or other appropriate recesses 27 in the nearer faces of the brake disc 16, the spring being tensioned to normally retain the brake discs spaced apart whenever free to be so spaced.

As best seen in Figure 7, the said energizing plates are connected against further separation relative to each other in their established spacing and against angular or rotative movement of plate 14 by appropriate bolts 18, 18, each having a head 19 preferably embedded and seated in the respective energizing plate 14, and each extending through relatively short arcuate slots 20 in the braking discs 16, and each being threaded through plate 12 or 12' as indicated at 17. The inner terminals of the several bolts 18 are preferably squared or otherwise polysided, as at 21, to receive an operating tool, and outward of the polysided portion 21 the thread of the bolt extends beyond the energizing plate and receives a nut 22. Each nut 22 may be and preferably is of the castellated type having a locking cotter pin to prevent unintentional alteration in its location. The nuts 22 are seated against the inner face of plate 12 or 12', and thus serve as lock nuts and also to aid in taking the strain transmitted from the energizing plate 14. To adjust the energizing plate 14, it is only necessary to loosen the nuts 22 and rotate the bolts 18. Such rotation is accomplished with facility by an instrument engaging the respective squared portions 21, but the bolts 18 may be rotated by an instrument engaging the heads 19, such as a screw-driver engaging a kerf in the respective heads. The heads 19, however, are not readily available for access while the parts are in their operative location, so that the adjustment is preferably accomplished by engagement of the squared portions 21.

It should be obvious that when desired the openings through plate 12 or 12' for bolts 18 may be unthreaded and of sufficient size to permit the bolt to be moved longitudinally therethrough, as shown at 17' in Figure 8, and the nuts 22 in such structure will serve both for adjustment and for retaining the parts in set position. In such construction, the adjustment of the nuts 22 along the respective bolts 18 will vary or enable variation of the spacing between the plates 14 and 12 or 12'.

The inner face of energizing plate 14 and the outer face of energizing plate 14 and the outer face of energizing plate 12 or 12' (as the case may be) is formed with recesses 23 preferably uniformly spaced about the respective plate, each of the recesses being provided with inclined walls extending generally in the direction of a circle concentric with the plate, the sides of each recess being abrupt to effectively confine the energizing rollers 24, there being a roller 24 located in each recess 23. Each of the braking discs 16 is formed with a set of recesses 25 corresponding in size, shape, and location to the recesses 23, so as to form pairs of recesses 23, 25, and a roller 24 is located in each pair of the recesses. Rollers 24, while free to roll lengthwise of the recesses, are confined against radial escape. It is obvious that the inclined walls of the recesses 23 and 25 along which the rollers 24 may move are susceptible of being modified in degree of angle of inclination according to the rapidity or slowness with which it is desired to have the energizing rollers 24 function to exercise a separating stress between the respective brake disc and the corresponding energizing plate. This separating stress is, of course, a leverage action by the roller against the respective engaged parts.

Extending between the brake discs 16 is a brake ring 28, which is preferably in the form of a flat annulus, and preferably has its flat faces lined with appropriate friction material 29, such as any well known brake lining, located to contact with the contiguous faces of the brake discs 16 when the discs are brought sufficiently toward each other. The brake ring or annulus 28 is preferably provided outward of the brake disc 16 with a circumferential T-head 30 with which is preferably formed integral, outstanding keys 31 slidingly mounted in key-ways 32 formed in the inner face of the cylinder 2 of drum 1. Any appropriate number of key-ways 32 and keys 31 may be employed, but three will be found satisfactory for average construction. Thus, the brake ring, while free to float laterally of itself and of the brake discs, that is longitudinally of the axis of rotation, is held positively to rotate with the drum 1 and its connected parts while the brake discs 16 are held rigidly against rotative movement except for the slight movement incident to the rolling of the energizing rollers 24 along the respective recesses 23 and 25. The said energizing rollers effectively prevent further rotative movement of the brake discs 16, since the energizing plates are not free to rotate.

A prime actuator is provided in the form of means for pressing one or both of the brake discs 16 into sufficient contact with the brake ring (or its brake linings) to cause the brake disc or discs to begin to move angularly. The slightest angular movement, of course, results in travel of the energizing rollers 24, which, in moving along the inclined walls of recesses 23 and 25, tend to force themselves into the tapering space between said walls so that that space is widened, and this movement of the rollers 24 therefore moves the engaged brake disc axially or laterally relative to its respective energizing plate. The respective brake disc is thus moved toward the brake ring. The frictional engagement between the ring and the plate is thereby proportionally increased. Only a slight initial stress needs to be supplied to one or both of the brake discs 16 to cause the momentum of the moving brake ring to impart sufficient movement to the energizing rollers for further shifting of the brake discs into more and more effective braking positions.

The utilization of the momentum of the brake ring and the parts carrying it thus enables application of enormous power when and if desired. By the provision of effective control and nicety and precision of application of the initial pressure of the prime actuator, the speed, smoothness, and extent of utilization of momentum for actuating the energizing rollers 24 is assured and governed. This initial application may be accomplished by a large variety of details of apparatus, one preferred form being shown in Figures 1 to 4 inclusive to consist of a rod or bolt 33 which extends through appropriate arcuate slots 34 in the brake discs 16 and preferably inward through the inner energizing plate where the rod 33 is preferably engaged by actuating mechanism. The outer terminus of the rod 33 is provided with means of engagement with the outer face of the outer brake disc 16, such as nut 36 threaded onto the rod. The outer face of the outer brake disc 16 is preferably formed with a depression 34' bordering the slot 34 and forming a seat for the nut 36, which seat slides across the nut when the disc 16 is moved rotatively. Rod 33, of course, does not move with disc 16 in its rotative movement. The engaging means between rod 33 and outer disc 16 is susceptible of a wide range of modification, one effective embodiment consisting of a washer or plate surrounding the outer terminal portion of rod 33 and resting against the outer face of outer disc 16 and held thereby by nut 36 in which case the depression 34' is not required. Such a washer is seen at 35 in the embodiment seen in Figure 16, hereinafter described. An aperture 37 is preferably formed in the energizing plate 14 to accommodate the nut 36 and any cooperating part accompanying the nut. Aperture 37 is of sufficient size to enable the nut to be applied and removed through the aperture.

Thus, it should be seen that a longitudinal thrust or pull on the rod 33 sufficient to overcome the expanding pressure of the spring 26 and causing the outer disc 16 to move into contact with the lining of brake ring 28 will be effective in applying the brake. Such movement will result in the outer brake disc being moved angularly incident to the movement of the brake ring, and the bolts 18 will transmit the movement to the inner brake disc 16, so that the two discs move as a unit. Reference is had to the direction toward the outer face of the wheel as "outer", and to the opposite direction as "inner". This angular movement, resulting in the riding of the energizing rollers 24 up the inclined sides of recesses 23 and 25 produces the axial shifting of plate discs 16 toward each other to the requisite extent for effective braking action. The movement, of course, will be in degree and speed governed by the extent of the initial actuation, so that the actuator made up of the rod 33 and its engagement with disc 16, by being effectively governed in timing and extent of its thrust, will likewise govern the extent and smoothness of the supplemented application incident to energization under momentum of the energizing parts. Likewise, speed and effectiveness of release of the brake discs is accomplished by the timing and extent of the release of the brake discs for separation by spring 26 incident to release of the engagement of the prime actuator. Just as soon as and to the same extent as the prime actuator is released, the spring 26 acts to spread or space apart the brake discs 16, and to thus relieve further braking action.

It is, accordingly, important to provide operating means for the rod 33 which will exert the required pull without over-exertion and without suddenness of application. This may be accomplished in any of numerous ways, some of which are disclosed in drawings hereinafter to be described, and one of which is indicated in Figure 4 consisting of a spiral cam 38 normally seated in a cam cup 39, the cam 38 surrounding the rod 33 and engaging the nut or other terminal head 40 at the inner end of the rod. An operating crank arm 41 outstands from the body of the cam 38 to impart rotation thereto and effect camming action thereof when the arm 41 is swung through an arc, whereby the rod 33 is given a longitudinal pull or inward thrust with the rocking of the arm 41. A wire or other cable or actuator 42 engages the arm 41 for remote, manual control and actuation thereof. Such remote control may, of course, be the usual foot lever where the apparatus is applied to an automobile. Further details of the spiral actuator cam and cooperating parts are susceptible of a wide range of variation, and are more fully disclosed in connection with the embodiment illustrated in Figures 14 and 15 of the drawings which are hereinafter described. For the present, it is sufficient that the rod 33 is subjected to a pull, whether through the cam shown in Figure 4 or by other means illustrated in other figures of the drawings and hereinafter described, so long as the pull is maintained under effective control and is exerted with respect to timing and force such as to give the required and desired smoothness of braking application.

The details of construction of the wheel or drum carried by drum 1, of course, are susceptible of any extent of modification, one conventional and at present popular embodiment being illustrated as consisting of a rim 43 having the customary demountable anchorage 44 to the drum 1. The hub 3 in each instance is preferably locked against axial escape from the axle, as by a retaining nut 45 secured by the usual cotter pin 46. The hub 3 of the structure seen in Figure 4 is journaled on its axle while the hub 3 of the embodiment seen in Figure 2 is keyed, as at 47, to its axle, but these are details of wheel construction having only incidental relation to the brake structures which comprise the present invention. Such details are immaterial and susceptible of limitless modification so far as the present invention is concerned.

It will be observed that by virtue of the adjustability of the nuts 22 wear may be taken up and the brake may be "adjusted" so as to insure uniformity of action of a multiplicity of such brakes. Also, by virtue of this adjustment of the brake discs relative to each other incident to the adjustment of the energizing plates toward each other, the application of the brakes under the power of momentum may be effectively adjusted so as to be readily controlled to a nicety and precision that insures that character of braking action affording the smooth and yet rapid cessation of movement destined to prevent shocks and jars and to avoid injury to the operator incident to too sudden stopping of his vehicle.

The brake discs may be modified in form and construction to a substantial degree and may or may not be provided with cooling flanges and other details according to the use and service required, but one preferred embodiment of such brake discs includes the provision of heat-radiating fins 48 at the exposed faces of the discs.

In Figures 8 and 9 there is illustrated an embodiment of the invention corresponding exactly with that above described except for the shape of the energizing elements and the cooperative shape of the recesses receiving such elements. Accordingly, the same reference numerals have been applied to identical parts and the same description will equally apply. In this construction the energizing plates 12' and 14 are formed with recesses 23' which instead of having the rounded base, as seen in Figures 12 and 13, have a flat base, so that each of their inclined sides meets the base at an angle indicated at 23''. Each of the braking discs 16 of Figures 8 and 9 has a corresponding recess 25' for each recess 23' of the cooperating energizing plate. Each recess 25' is of substantially the same contour as the recesses 23', and is thus provided with the angles 25''. A lever block 24' or energizing element is located in each pair of cooperating recesses 23' and 25'. The blocks are substantially square in cross section so as to present angles to the angles 23'' and 25'', whereby any relative movement angularly of a brake disc 16 with respect to an energizing plate causes the interposed blocks 24' to rock on their angles, (erroneously referred to in common parlance as corners,) so as to assume to a greater or less extent, according to the degree of application and relative angular movement of the respective braking disc, the position indicated in full lines in Figure 9. Thus, the diagonal of each of the several blocks 24' is partially interposed between the braking disc and the respective energizing plate, and the braking disc is accordingly and proportionally shifted axially toward the brake ring. Release of the respective brake disc by the initial actuator allows the interposed spring 26 to move the braking discs apart and release the braking action, and restore the blocks 24' to their full line position of Figure 8 and dotted line position of Figure 9.

It should be observed that whether the blocks 24' or the rollers 24 are used, the movement of the brake discs angularly or in a rotative direction is only slight, as plainly seen in Figure 9, since only a very short movement is required in the angular direction to effect a tightening action of the brake discs against the faces of the brake ring representing a high degree of frictional engagement. It is obvious that the blocks 24' function as levers in energizing the brake discs 16 to more effective braking relation with the brake ring, and that the rollers 24 similarly act as levers in accomplishing a similar result.

In Figures 10, 11, 12, and 13 is illustrated another slight modification from the embodiment of the invention as seen in Figures 2 and 4, in that, instead of having a single set of energizing elements between each energizing plate and its respective brake disc, two sets are provided for at different distances from the axis of rotation, so that when all are used in a single unit the braking power is enormous; but this construction possesses the further advantage that either the inner set or the outer set may be utilized according to the braking power required, as, for instance, if comparatively powerful braking action is needed, such as for heavy trucks, busses, and the like, the outer set may be employed, and where lighter braking action is called for, as in pleasure vehicles, the inner set may be utilized. These comparisons are, of course, relative, and the two sets may be proportioned for pleasure vehicles of different weights, or for the heavier vehicles of different weights. In carrying out this feature of the inventive concept, the apparatus employed is substantially identical with that above described, except that the energizing plates (both inner and outer when two are utilized) indicated as 14a are provided with a series of recesses 49 spaced outwardly of the respective plate, and a second series of recesses 50 spaced inwardly of the plate with reference to the recesses 49, so that the inner set is nearer the axis of rotation, and, therefore, offers less leverage opportunity than the outer set. In this structure, of course, each brake disc 16a has two sets of recesses comprising an outer set 51 and an inner set 52. The energizing levers to be located in the cooperating recesses 50 and 52 and in the cooperating recesses 49 and 51 may assume either of the forms above disclosed, but, by preference, the roller form, as indicated at 53, is employed, and acts as described above with reference to the energizing rollers 24. Of course, where the block type of energizing lever is utilized in this embodiment the respective recesses will be provided with the angles to cooperate with the angles of the block as shown in Figure 9, but when the roller type of lever 53 is used, the recesses corresponds with the recesses 23 and 25 in general contour. As seen in Figure 12, each recess 50 or 52 is substantially V-shape with relatively high angle sides or planes 54, 54, which may extend into the respective plate to the place of meeting at an angle; but for the saving of material (so that the plate at the particular place may remain as thick as possible) the planes or sides 54 are preferably terminated in a rounded portion 55 which is spaced from the adjacent portions of the roller 53 incident to the fact that the planes 54 are at such an angle with respect to each other and are sufficiently extended beyond the roller 53 to prevent the roller from seating in the base 55 of the recess. This resulting spacing has the advantage, among other things, of insuring that any wear of the roller will be effectively taken up without the possibility of any play developing between the sides of the roller and the adjacent sides 54 of the recess. In other words, the roller 53 is at all times firmly seated against both sides 54 except when rolling up one or the other of said sides or momentarily during initial actuation of the brake discs and before their rotative movement. Of course, the amount of wear of roller 53 will be extremely slight if any occurs at all, since it is preferable to have the rollers 53 as well as the blocks 24' and rollers 24 and all similar elements hereinafter mentioned case-hardened or otherwise appropriately tempered to insure against wear. Nevertheless, if any relative wear does occur, the space provided at the base 55 by the relative angle and extension of the sides 54 insures against any possible rolling movement of the roller 53 or like lever within the recess while the respective energizing plate and brake disc are not being moved relative to each other. The space thus provided by the location of the base 55 may be relatively slight, but is always preferably present, and is, in fact, present in the recesses 23 and 25, as seen in Figure 7 and in other figures of the drawings, although the depth of such clearance space is such as to be occupied by the shading in the drawing of Figure 7 and similarly occupied in the drawing of Figure 13. Whether wear has occurred or not, the lever element or roller 24 or 53 in each instance, being spaced from the bottom of the respective recesses in the energizing plate and in the brake disc, is always in contact directly with both inclined walls of each recess except as above noted, and any looseness occasioned by axial movement of the brake discs before rotative movement thereof is so slight and so quickly taken up that the several rollers 24 or 53 or their equivalents act practically instantly upon and co-incident with any slightest relative angular or rotative movement between the brake disc and energizing plate. No lost motion or play ever exists when the parts are non-active, such as might develop if the lever element or roller 24 or 53 could have rolling movement, however slight, along the bottom of either of its cooperating recesses before contacting with an inclined wall thereof. No lost motion of this kind can develop. With the square lever elements, such as 24', the block in each instance fits snugly the bottom of the respective recess so that the respective angles of the block seat against the angles of the recess and prevent any possibility of sliding movement of the block along the floor of the recess.

In Figure 13, one of the outer set of recesses, that is a recess 51, is shown with its side walls 56 at a more obtuse or lower angle than the walls 54, since a circle described about the axis of movement and touching the recesses 51 would be larger than a circle similarly located and touching the recesses 52, and consequently the available travel of the roller 53 is greater. In consequence, the lower angle of the surfaces 56 affords, incident to the greater travel, a greater leverage and a consequent increase in pressure applied. It follows, therefore, that in addition to the advantages, and, in fact, as a part of the advantages pointed out above inhering in the multiple sets of energizers and their recesses, the inner set that is the set nearer the axis of rotation, may be utilized in a pleasure vehicle to provide what may be called a light pedal as for use by ladies, where the outer set more remote from the axis of rotation may be used for producing a medium pedal for use by men as requiring more energy of application.

In Figures 14, 15, and 16 is shown the identical structure as seen in Figures 1 and 2, except for a modification of the prime actuator and the fact that the operating cam and actuating parts therefor for the prime actuator is illustrated, and also the spacing spring for the brake discs has its ends anchored to the discs to insure return of the discs angularly to their initial positions relative to each other upon release after a braking operation. Accordingly, the same reference numerals have been applied to Figures 14, 15, and 16, and the same description will apply with respect to all those parts identical in these figures to the features of construction of Figures 1 to 8 inclusive.

In this connection it should be borne in mind that when the structure seen in Figure 7 is subjected to the impulse of the prime actuator which shifts the outer brake disc 16 into frictional engagement with the brake ring, the brake ring floats laterally into frictional contact with the inner brake disc, so that both of them are subject to the momentum of the brake ring and are moved angularly, resulting in the lever action of the rollers 24 and the momentum effected tightening of the brake discs 16 against the brake ring 28, or its brake linings 29. The total actual axial shifting of the parts is in practice only for a relatively short distance.

The characteristic distinction between the prime actuator of Figures 14 and 15 and that of Figures 1 to 7 inclusive is the fact that the latter imparts a thrust directly against one brake disc only; whereas in the former provision is made for equalizing the thrust and simultaneously shifting both brake discs toward each other and consequently toward the interposed ring 28. To this end, the operating rod 33 of the prime actuator, as seen in Figure 16, is not only engaged by the spiral cam 38 cooperating with the spiral cam cup 39 and actuated by the operating lever 41, but is provided with a sleeve 57 extending from the cam cup through and keyed at 58 to the inner energizing plate 12'. Sleeve 57 may reciprocate but not rotate. Sleeve 57 may be, and preferably is, formed integral with the cam cup 39, so that, when the cam 38 is rotated and thus imparts an inward thrust against the nut 40 and the rod 33, a corresponding opposing thrust through the action of the cam cup 39 is imparted to the sleeve 57. The outer end of the sleeve 57 abuts against the inner face of the inner brake disc 16 while the outer face of the outer brake disc 16 is engaged by the washer or bearing plate 35 backed by the nut 36 on the rod 33, so that the inward thrust on the rod 33 will effect an inward movement of the outer brake disc while the outward thrust on the sleeve 57 will effect an outward shifting of the inner brake disc so that the two brake discs are caused to approach each other against the expanding pressure of the spring 26. Thus, floating movement of the brake ring is not required and a quicker application of the brake discs is obtained.

As best seen in Figure 16, the bearing plate or washer 35 is preferably provided with an elongated sleeve extending into the recess 37 and surrounding the rod 33 so as to stiffen and strengthen the same in resisting and carrying lateral stresses. It will be noted that the rod 33 extends through slots 34 in the brake discs 16 which are of sufficient length, as plainly seen in Figures 1 and 6, to allow the requisite independent rotative travel or angular movement of the brake discs 16, but the friction of the faces of the discs against the washer or bearing plate 35 tends to laterally strain or bend the rod 33, and the sleeve of the washer or plate 35 effectively aids in resisting such strain.

The spring 26, as seen in Figures 2, 4, and 7, may be connected at its ends to the respective brake discs 16 to insure relative restoration of the discs in their angular movement when released from a braking operation, such restoration being a mere equalization between the two discs, and the method of anchorage of the spring is plainly shown in Figure 15 wherein the ends 59 of spring 26 are turned approximately at right angles to the wire of which the spring is made, so that the said ends outstand lengthwise of the coil making up the spring 26, and the said ends 59 are seated in appropriate recesses 59' in the brake discs 16 so that, if one disc is moved angularly, the other will be resiliently so moved even though otherwise free. Hence, the spring 26 not only keeps the brake discs 16 spaced apart and free from braking operation when said discs are released, but equalizes their angular adjustment, so that one is not desired to be angularly advanced or retarded materially farther than the other when released.

It should be observed in this connection that the braking action of the discs 16 is just as effective and is accomplished in identically the same manner with identically the same results whether the brake ring 30 be rotating in one direction or the other. It is, therefore, made possible by the present invention to brake an automobile moving backward with the same degree of efficiency, ease, comfort, and nicety as if the car were moving forward.

It should be understood, of course, that the cam 38 and cam cup 39 and the parts for actuating them are susceptible of a wide range of variation, and, in fact, any number of other actuators may be utilized for affording the same character and kind of thrust as accomplished by these parts. The wire 42 above referred to is better seen in Figure 14, and though, of course, the actuator for lever 41 may assume any of numerous embodiments, one arrangement for the control wire is seen in Figure 14 wherein the wire 42 is connected to the fork 60 which is pivoted to lever 41, and the wire extends thence into an appropriate guiding armor or tube 61 which is clamped to a bracket 62 fixed to the energizing plate 14, and a spring 63 is interposed between the bracket 62 and the fork 60 to restore the lever 41 and cam 38 to the initial position after an operating thrust.

The invention as embodied in the above description contemplates the employment of dual energizers, that is means of imparting thrust directly to both braking discs from relatively opposite sides toward the interposed brake ring, but, of course, the invention is in no sense limited to the dual energizers, since it is effectively applicable to the energizing of the brake discs by momentum-delivered impulse actuated through energizing apparatus acting against only one brake disc of a pair. The invention is equally applicable to a single brake disc where only one brake disc is used. The energizing from one face of one brake disc only is disclosed in the embodiment of the invention seen in Figures 17 to 22 inclusive. In these figures, the embodiment is illustrated as applied to the dirigible wheel of an automobile, but obviously may be applied to the rear wheel with equal facility.

Referring to Figures 17 to 19 inclusive in detail, the swiveled hub 64 is pivoted to the end of the front axle 65 by the usual king pin 66. Bearing plates 67, 67 are preferably interposed between the axle end and the hub, and bearing sleeves 68, 68 preferably surround the king pin 66 in the bores of the hub 64, but, for purposes of the present invention, the hub may be swiveled in any desired manner. The wheel bearings and other wheel parts are omitted from Figures 17 and 18, but are seen in Figure 25 for effectiveness and completeness of disclosure, though not in themselves a part of the present invention. To the outer end of the hub 64 is fixed the inner brake disc 69 which cooperates with the floating brake disc 70, while the brake ring 71 is interposed between these two brake discs. Ring 71 may be of any appropriate construction, consisting preferably however of a flat annulus with a T-head 72 at its outer periphery having outstanding ears or perforated lugs 73 spaced uniformly about the ring to slidingly engage and suport the ring on axially extending studs carried by the wheel structure and not shown in Figures 17 and 18, but disclosed in Figures 24 and 25. Thus, the ring 71 is free to float laterally. The ring is preferably provided with appropriate brake linings 74, 74 against which the braking faces of the brake discs 69 and 70 engage during operation. The brake discs 69 and 70 are maintained, when free, spaced apart and out of contact with ring 71 or its linings by the interposed spring 75 corresponding in arrangement and function with the spring 26 of the structures above described. The ends of the wire or rod of which spring 75 is formed are turned abruptly to outstand in the general direction of the length of the coil making up the spring and are located to be seated in recesses 76 in the respective brake discs 69 and 70, so that, when the brake disc 70 is free, it will return angularly to its initial position under the torsional stress of the spring 75, which thus functions to restore the brake discs 69 and 70 to alinement as well as to their spaced relation when the brake disc 70 is free to allow such restoration. As a matter of efficacy in construction, the brake disc 69 is preferably provided with an outstanding sleeve 77 of sufficient length to extend through and form a support for both the brake disc 70 and the energizing plate 78 arranged outward beyond the disc 70. Obviously, the sleeve 77 may be formed otherwise than integral with the disc 69, but such integral formation enables facility of assemblage as a unit of the braking parts for convenience during transportation and handling.

The brake disc 69, when applied for operation, is fixed to the hub 64 or like non-rotating part, and the connection may be accomplished in any of various available ways, one of which consists in the provision of bolts 79 extending through the brake disc 69 and threaded into the hub 64. Any appropriate number of these bolts 79 may be utilized, but three have been found satisfactory for usual constructions. Each bolt 79 is preferably of the fillister head type with the head seated in the brake disc 69 in a counterbore or recess provided to enable the head to enter sufficiently for the outer end of the head to lie flush with the outer surface of the brake disc. Obviously, other forms of bolts and other methods of anchorage of the disc 69 to the hub 64 or other non-rotating part may be employed.

To transmit the strains both axial and torsional from the energizing plate 78 to the hub 64, bolts 80 extend through discs 69 and 70 and through the plate 78. As seen in Figure 17, each bolt 80 extends through an appropriate slot 81 in the brake disc 70 so as to leave the brake disc free for angular movement, that is rotative movement, as required, but each of the bolts 80 may have a body fit or otherwise snugly seated in the respective opening through the brake disc 69, and each bolt preferably is provided with a flat face beveled head 82 countersunk in the inner face portion of brake disc 69. The outer or free end of each bolt 80 is engaged by a nut 83 adapted to be adjusted to properly locate the energizing plate 78 with respect to the other parts, whereby the brake may be "adjusted" as an entirety whenever through wear of the brake linings 74 or otherwise adjustment and equalization between several brakes becomes desirable or necessary. Castellated nuts 83 with appropriate locking pins are preferably employed to insure against accidental loosening.

The energizing plate 78 is provided with recesses 84 preferably spaced uniformly about the plate and corresponding to and cooperating with similar recesses 85 formed in the outer face of brake disc 70. The recesses 84 and 85 are substantially the same in general form to recesses 23 and 25 of Figures 5 and 6, except that the recesses 84 and 85 are substantially elongated in a radial direction and each set of recesses 84, 85 contains an energizing roller 86 which is similarly elongated, and which is tapered to correspond to the difference in radius so as to move relatively uniformly across the surfaces with which it contacts.

A prime actuator is provided for initially shifting the brake disc 70 into frictional engagement with the braking ring or its outer lining whereby the brake disc 70 is given a rotative or angular movement under the momentum of the brake ring 71, and thus the rollers 86 are caused to roll up the inclined sides of the respective recesses 84 and 85 and accordingly impart axial thrust to the brake disc 70. This thrust causes the disc not only to move into tighter engagement with the brake ring but shifts the brake ring laterally into correspondingly tight engagement with the brake disc 69, so that both surfaces of the brake ring are engaged and movement proportionally resisted.

The prime actuator for the disc 70 may be that above described or may assume any of several forms available for the purpose, one effective form being shown in detail in Figures 20 and 21. This form of prime actuator consists of the thrust rod 87 extending through a passageway in brake disc 69 and through an arcuate slot in brake disc 70, and also preferably through the energizing plate 78, plate 78 being formed with an elongated opening 88 to accommodate the rod 78 and parts carried thereby. The outer end of the rod 87 is provided with a head preferably in the form of a castellated, threaded nut 89, and inward of the head a sleeve 90 surrounds the rod 87 and is formed integral with or carries a block 91 proportioned to reciprocate in the aperture 88 along with the reciprocal movement of the rod 87. Opening at the inner face of the block 91, the block is formed with a recess 92 in which is located a pivotally mounted trigger 93 having its inner end preferably rounded off to produce a substantially globular bearing 94. The outer portion of the trigger 93 is preferably pivoted by being penetrated by a bolt 95 threaded into the block 90 and extending across the recess 92. Thus, the trigger 93 is free to swing on the bolt 95, and as the block 88 extends radially and the bolt 95 is located longitudinally of the block, the trigger 93 swings approximately in a direction circumferentially of the plate 78, or, in other words, in the general direction of movement of the brake disc 70 when the brake disc is shifted angularly by the brake ring. In the outer face of the brake disc 70 is a recess 96 in which the globular end 94 of trigger 93 is seated. Thus, an inward thrust of rod 87 will impart a similar movement to block 91 and to trigger 93, which shifts the brake disc 70 into braking engagement with brake ring 71, and then, as the brake disc 70 is moved angularly by the momentum of the brake ring, the trigger 93 will swing upon its pivot and thus avoid friction with the brake disc while leaving the brake disc maximum freedom to respond to the angular advance imparted by the brake ring.

The longitudinal thrust of rod 87 may be imparted by any appropriate apparatus or means such as is above described, or other means may be utilized, such as an operating wire or rod 97 which is effectively anchored to the inner end of the rod 87, as by being seated in a longitudinal recess in the inner end portion of the rod and being brazed or otherwise effectively fixed therein. The inner end portion of the rod 87 is accommodated in a passageway 98 formed in the hub 64, which passageway at its inner extremity terminates in an enlargement into which the armor sheathing or tube 99 which surrounds and protects the wire or rod 97 extends. The armor sheathing 99 may be anchored in this seated position in any appropriate manner, such as by the provision of a clamp 100 engaging and firmly clamped to the sheathing 99 and in turn secured to the hub 64 by bolt 101.

The prime actuator for the brake disc may assume many other embodiments which operate effectively, such as are seen respectively in Figure 23 and in Figures 36 and 37. In Figure 23 the structure is quite similar to that seen in Figures 20 and 21, and corresponding parts bear the same reference numerals and the same description is applicable. However, in this structure instead of utilizing the bolt as a pivot within the block 91, the block is formed with a parti-globular recess 102 and a threaded bore leading to said recess, in which bore is threaded a sleeve 103 having at its outer end a parti-globular recess continuous of the recess 102, so that a ball 104 is accommodated and confined between the outer end of the sleeve and the recess 102, and outer portions of the sleeve are countersunk to allow freedom of movement of a trigger 105 formed integral with the ball and extending through the sleeve to engagement with the brake disc 70. The disc is provided preferably with the recess 106 receiving the parti-globular free end of the trigger 105. The operation of this structure is practically identically the same as that described with reference to Figures 20 and 21, except that the freedom for movement of the trigger 105 is more nearly universal, and the trigger, therefore, more accurately follows the arc described by the recess of the brake disc 70. Furthermore, the ball 104 is particularly efficient in receiving and distributing end thrusts with a minimum amount of wear.

The structure shown in Figures 36 and 37 corresponds largely with those shown and described with reference to Figures 20 and 21 and with reference to Figure 23, except for details which afford even still greater freedom of relative movement. The structure of Figures 36 and 37 includes the prime actuator rod 107 having the sleeve 108 retained by the bolt 109 and carrying the actuator block 110, which block is provided with an inwardly-extending, overhanging portion 111 having inclined surfaces 112, 112 meeting in an apex, which apex rests against a roller bearing 113 preferably in the form of a hardened steel roller which in turn rests in a recess 114 in the brake disc, such as disc 70. The operation is substantially the same as that described with respect to the structures seen in Figures 20, 21 and 23. The prime actuator movement consists merely in an inward thrust of rod 107 which imparts the necessary initial thrust to the brake disc that in turn received its angular movement from frictional engagement with the brake ring, and thereupon the bearing 113 rolls out along the inclined wall of the recess 114 and along one of the inclines 112. As the inclined wall of recess 114 is more abrupt than the corresponding incline 112, the result is a leverage action by the ball thrusting the brake disc further laterally against the brake ring. This particular form of prime actuator affords extreme nicety of control for applying the brake quickly yet smoothly and powerfully.

As is plain from the embodiment last above described in which a single set of energizing rollers 85 is employed, it becomes clear that the energization from the momentum of the brake ring and its connected parts may take the form of a lateral impulse delivered through only one of the brake discs, or, as seen in the other constructions preceding Figure 17, may assume the form of an impulse through both brake discs.

In Figures 24 to 29 inclusive is illustrated an embodiment of the invention similar to that of Figures 17 and 18 in respect to the employment of but a single energizing plate and single set of energizing lever elements. Referring to the embodiment illustrated in Figures 24 to 29 inclusive, 115 indicates the front axle of an automobile having the king pin 116 on which axle is mounted and about which king pin is pivoted the dirigible and otherwise fixed hub 117. Extending axially inward from and preferably formed integral with the hub 117 is an eye 118 which receives the drag link 119, or other actuator from the steering wheel for swinging the hub 117 on its pivot. The hub 117 is formed with the longitudinal bore or opening 120 to receive and into which the free end of the axle 115 extends, and the hub is also provided with radial openings 121, 121 to accommodate the end portions of pin 116.

The detail construction of the hub 117 is susceptible of a wide range of variation, but should include appropriate connecting means for bearings for the rotating hub 122 having any appropriate wheel body 123 formed integral therewith or appropriately connected thereto. The bearings for hub 122 may consist of rollers 124 interposed between bearing cones carried respectively by the hub 122 and by the hub 117, those of the hub 117 being retained against axial escape by the flange 125 at one end of hub 117 and by the circumferential detent 126 at the other end thereof, which detent preferably assumes the form of a ring nut threaded onto the outer end of hub 117. The bearing cones of hub 122 are retained in place by the bearing rollers 124 and through them by the bearing cones of hub 117.

The outer end of hub 117 is formed into a clutch face, as by being provided with substantially rectangular recesses 127 extending in the direction of the length of the hub and opening at the outer end thereof. Outward of the hub is arranged the inner brake disc 128 cooperating with the outer brake disc 129, and the two discs having therebetween the brake ring 130, which ring in turn is provided with radially outstanding eyes 131 freely and slidingly mounted on the axially extending pins 132 fixed to and carried by the body 123 of the wheel. There are preferably at least three of the pins 132, and, of course, a corresponding number of eyes 131, but a greater number may be readily provided where the load stresses demand, and even a less number may be utilized where the load stresses are to be sufficiently light. As with the eyes 73, each of the eyes 131 is preferably reenforced at one side by a fillet 133 located to receive and transmit the braking stresses to the wheel when the wheel is being retarded in its forward movement. Obviously, similar fillets may be utilized at the opposite sides of the eyes where the load stresses demand. The brake ring 130 is preferably provided with brake linings 134, 134.

The inner surface of the inner brake disc 128 is formed with a clutch face, the complement of the clutch face of the outer end of hub 117 having the outstanding lugs 135 shaped and located to be snugly received by the recesses 127, so that, when the parts are assembled, the torsional stress to which the brake disc 128 is subjected during a braking action will be transmitted to the hub 117 through the lugs or teeth 135 directly to the hub, and the retaining bolts which prevent the disc 127 from possible lateral escape are not depended upon as in the structure seen in Figure 18 for transmitting the braking stresses. Any appropriate retaining bolts or securing means may be employed to prevent lateral separation of disc 128 from hub 117, such, for example, as the securing bolts 136, 136, each having its head preferably inset into the plate 134 with its outer end flush with the outer surface of the plate and the body of the bolt extending through the plate and threaded in the body of the hub 117. Fixed to the plate 128 and outstanding in an axial direction therefrom are the studs 137, 137, each of which extends through an arcuate slot 138 in the brake disc 129, and beyond the brake disc through the energizing plate 139. The outer end portion of each of the studs 137 is threaded and is engaged by a nut 140. Each nut 140 is preferably provided with an inwardly-extending annular boss or sleeve 141, seen in Figure 25, the said boss or sleeve in each case being proportioned to extend into and snugly fit the opening through the energizing plate 139 through which the respective stud 137 extends, whereby each nut 140 affords an effective bearing for the respective stud on the plate 139 and successfully resists any tendency toward rotative or angular movement of the energizing plate 139. To insure rigidity of the several studs 137 and effective capacity to resist rotative movement, each is provided with a circumferential enlargement or ridge 142 abutting against the outer face of the disc 128 while the inner end of the respective stud is swaged up to fill the recess at the inner face of the disc and to lie flush with said inner face while the stud is thus effectively riveted in and anchored to the disc 128.

The outer disc 129 floats on the studs 137 and so has free axial play. The disc 129 is provided preferably with an integral, outstanding boss or sleeve 143 which extends through and slidingly engages the energizing plate 139, so that disc 129 also floats on plate 139. Energizing blocks 144 are disposed between the plate 139 and the disc 129, and the plate and disc are provided with recesses 145, 145 accommodating said blocks so that they are constructed and operate to function the same as blocks 24'.

The prime actuator in this construction may assume the form of any of those above described, since it is essential only that effective delivery and control of the initial thrust of the disc 129 be provided for. To this end, one acceptacle construction consists in the provision of a wire 146 fixed to the inner end of a rod 147, which rod extends outwardly through the discs 128 and 129, and is provided at its outer end with a nut 148 engaging an annulus or actuator plate 149 surrounding the rod 147 and seated against the outer face of the disc 129. The wire 146 and rod 147 extend through the hub 117 and the rod is free to reciprocate therein and through the discs 128 and 129. The rod is accommodated through the disc 129 by an arcuate slot to allow the disc to have angular or rotative movement while the rod is held against moving with the disc. The wire 146 extends to any appropriate actuating and controlling mechanism.

The disc 129 is constantly stressed outward by an appropriate, preferably coiled spring 150 arranged coaxial with the discs 128 and 129 and surrounded by the former, the inner end portion of the coil resting against seats 151 in the outer end of the hub 117 outward beyond the end of the axle 115.

While the spring 150 is shown solely as functioning to stress the disc 129 away from its braking position, the spring may well be constructed to have its inner end fixed to the hub and its outer end fixed to the disc 129 in any appropriate manner, such as shown and described above with respect to the anchorage of the ends of the spring 75, whereby the spring will be slightly further coiled or uncoiled (according to the direction of movement of the disc) with the movement of disc 129 under the engagement and momentum of ring 130. Such a connection would thus tend to quickly restore the disc 129 to its normal, initial position both angularly as well as axially. However, the blocks 144 under the stress of the expansive force of spring 150, when the braking action has been discontinued, act to restore the disc 129 angularly, and anchorage of the spring 150 at its ends to the hub and disc respectively would serve merely to supplement such return movement.

The operation is believed to be clear from what is above stated with respect to other embodiments, and consists in the initial actuation of disc 129 through an impulse imparted through wire 146, rod 147, and plate 149 followed by the friction-delivered momentum-acquired force of the brake ring 130 which causes the disc 129 to shift further laterally and thus causes the disc 129 to be shifted laterally into tighter frictional engagement with the disc 128 until the required braking condition has been achieved. The prime actuation through wire 146 and its connected parts in shifting disc 129 in the first place causes some contact between the brake ring 130 and disc 128 to afford sufficient frictional engagement of disc 129 with ring 130 to cause the disc 129 to travel with the ring and thus occasion the momentum-produced energizing action of the blocks 144.

The form and construction of the wheel, and particularly of the peripheral portion of the wheel and whether or not a demountable rim is employed is no part of the present invention, and the invention is obviously as applicable to a drum of any kind, such as a belt drum, as to an automobile wheel with which it has been illustratively disclosed; but it will be observed that the brake lends itself effectively to a construction of wheel wherein the brake is made readily accessible for adjustment and repair by having the brake at the outer face of the wheel as clearly seen in Figure 25. This is accomplished without in any way interfering with the employment of the conventional demountable rim 185, which may be provided with any well known form of tire, or other details as desired, and which has the anchoring flange 186 through which the securing bolts 187 extend. Bolts 187 are passed through appropriate portions of the wheel body 123, and are preferably readily detachable therefrom. A nut 188 engages the outer or free end portion of each bolt 187, and each nut 188 is preferably formed conical at its inner end to enable wedging to a firmly seated, centered position of the rim 185 on the wheel. An eccentric head on each bolt 187 fitted in a recess in the wheel body prevents the bolt 187 from turning when the nut 188 is being applied or removed.

The single energizing type has the advantage, where two brake discs are used, of enabling the inner brake disc to have a rigid connection with the non-rotating mounting, providing, of course, the energizers are located outward of the outer brake disc. Other location thereof is obviously available. However, of course, with the single energizer type there is a proportional reduction in stability and speed of power transmission by the energizer elements, so that the double energizer type lends itself effectively to certain classes of brake and clutch construction.

In Figures 30 and 31 is illustrated a further embodiment of the double-energizer type similar in many respects to the embodiment seen in Figure 4, but applied to a different type of wheel construction. In this embodiment, 152 indicates the rigid axle to the end of which is swiveled by the king pin 153 the hub 154, which is provided with appropriate bearings 155 for the wheel 156 on which is mounted the demountable rim 157. Preferably at uniformly spaced points about the wheel 156, appropriate bolts 158 are provided and are anchored to the wheel, as by riveting or other effective rigid connection, so as to outstand axially from the outer face of the wheel. Any desired number of the bolts 158 may be utilized, three being sufficient in some instances, though the number may be increased or decreased according to the load to be distributed. The rim 157 and the peripheral portion of the wheel 156 may be of any acceptable or popular construction, such for instance as that clearly seen in Figure 31 wherein a wedging action to a tightly seated position is obtained for the rim when the rim is forced to a seat on the periphery of the wheel 156 by the force of nuts 159 on the bolts 158 acting to thrust retaining plates 160 loosely mounted on the bolts 158 against integral or rigidly connected portions of rim 157, such as plates 161.

Outstanding axially from the outer end of the hub 154 and effectively fixed thereto by being preferably formed integral therewith is a sleeve 162. Brake discs 163, 163 surround the sleeve 162 and slide axially thereon. Spaced uniformly about and between the discs 163 are springs 164, preferably of the coiled type, each seated at its ends in appropriate recesses in the respective faces of the discs 163 and tensioned to expand and thereby stress the discs apart. Three of the springs 164 are usually sufficient. Between the discs 163 is the brake ring 165 similar in form and function to the brake ring 28 and to the brake ring 71. However, the radially outstanding eyes 166 of the brake ring 165, instead of being mounted on studs outstanding axially from the body of the wheel, as in constructions above described, are slidingly mounted on the bolts 158, which thus serve the dual capacity of studs for the brake ring and wedge bolts for the demountable rim.

Outward beyond the outer brake disc 163 an energizing plate 167 is slidingly mounted on the sleeve 162, and appropriately keyed thereto so as to be held against revolving thereby. The key connection between the plate 167 and sleeve 162 may, of course, assume any appropriate form, an acceptable embodiment consisting of alternating and interlocking splines 168 and 169 formed integral with the energizing plate 167 and the sleeve 162 respectively. The splines 168 of the sleeve terminate short of the outer end of the sleeve, and the sleeve is preferably provided with a screw-thread 170 on which is threaded a ring nut or adjusting nut 171 adapted to be threaded on the sleeve 162 to a greater or less extent as required for setting the energizing plate 167 in the proper spaced relation from the outer end of the hub 154 to accommodate the discs 163 and the interposed energizing blocks 172, 172. Each block 172 is located in a set of recesses 173 similar to those shown and described with respect to Figures 8 and 9, there being a recess in the energizing plate 167 for each block 172 of the outer set and a corresponding opposing recess in the outer face of the outer disc 163 while the outer end of the hub 154 is provided with the recesses for accommodating the inner set of blocks 172, which recesses cooperate with corresponding recesses in the inner face of the inner disc 163. The action of the blocks 172 is the same as that of blocks 24', and the operation of the brake discs is also the same. It should be obvious that instead of the springs 164 a single coiled spring may be caused to surround the sleeve 162 between the discs 163 so as to function like the spring 26.

The prime actuator for the brake discs is the same as disclosed and described with respect to Figures 24 and 25, and includes the operating wire 174 having its armor cable 175 connected to the hub 154 in any appropriate manner, such as by the clamp 176 as seen in greater detail in Figures 18 and 19. The wire 174 is fixed to the rod 177 extending from hub 154 through arcuate slots in discs 163, 163, and having at its outer end a nut 178 and an annulus or bearing plate 179 resting against the outer face of the brake disc 163 for delivering the initial actuation to the disc for causing the disc to receive a rotative impulse operating the energizing blocks 172 and thus resulting in the braking action as hereinafter described.

It should be observed that the nut 171 not only retains the energizing plate 167 against outward movement, but is adapted to be threaded along the sleeve 162 for adjusting the brake as, for instance, when wear of the brake linings of ring 167 necessitates or renders desirable adjustment of the parts to take up play. Obviously, any appropriate locking means (not shown) may be employed to retain the ring nut 171 against loosening or shifting.

In Figure 32 is seen an embodiment of the invention of the single energizing type in which the brake ring is V-shaped in cross section, and, therefore, approached by brake discs having similarly inclined faces provided preferably by flaring or splaying the peripheral portions of the discs. The embodiment is otherwise similar in details to details above described and shown in preceding figures of the drawings. In the embodiment seen in Figure 32, the hub is indicated by the reference numeral 180 and is pivotally mounted on the front axle 181 by the usual king pin, not here shown. Hub 180 carries the appropriate bearings 182 on which is mounted the rotating hub 183 having the wheel body 184 formed integral with or otherwise appropriately fixed to the hub and corresponding substantially in details of construction with the wheel body shown in Figures 24 and 25. Any appropriate peripheral portion or demountable rim may be applied to the wheel body 184 by the bolts 187 after the manner shown and described with respect to the same bolt in Figures 24 and 25.

Rigidly anchored to the wheel body 184, as by riveting, are the studs 189, there being preferably three or more according to the stress to be distributed. Slidingly mounted on the several studs 189 are the supporting eyes 190 of the brake ring 191. Ring 191 is substantially V-shaped in cross section, and is preferably provided with brake linings 192, 192 adapted to be engaged by the flat faces of the splayed or flared portions 193 of the brake discs 194. The inner disc 194 at its hub portion is provided with a clutch face 195 intermeshing with a corresponding clutch face 196 formed on the outer end of the hub 180, whereby the inner brake disc 194 is effectively retained against angular or rotative movement. Bolts 197 extending through the inner brake disc 194 and threaded into the hub 180 after the manner of bolts 136 in Figure 25 retain the inner brake disc 194 against axial separation from the hub 180. Studs 198 are rigidly fixed to the inner brake disc 194 after the manner of studs 137 of Figure 25. Each stud 198 extends through an arcuate slot 199 in the outer brake disc 194 and through the energizing plate 200 outward of the outer brake disc 194. A nut 201 is threaded on the outer free end of each of the studs 198, and each bolt is preferably provided with an inwardly-extending sleeve 202 snugly fitting in the aperture in plate 200 through which the respective stud 198 extends, so that the plate is rigidly held against either outward axial movement or rotative movement.

The outer brake disc 194 is also preferably provided with an outstanding, annular boss or sleeve 203 slidingly extending through the plate 200 to serve as a guide in the axial movement of the outer brake disc 194.

The plate 200 and outer brake disc 194 have cooperating sets of recesses 204 in which the energizing lever elements 205 are located, which lever elements may assume either the form of rollers or of blocks, and, of course, the recesses 204 will be correspondingly shaped to cooperate in enabling the energizing elements 205 to stress the outer brake disc 194 axially inward with any rotative or angular movement of said outer brake disc. A coiled spring 206 is interposed between the hub 180 and the outer brake disc 194, and is tensioned to stress the outer brake disc outward to insure release of the brake and to preserve the proper spacing of the outer brake disc with respect to the other parts. A prime actuator 207 engages the outer face of the brake disc 194 to impart the initial axial thrust toward the brake ring 191, and the operation of this prime actuator and of the brake discs and brake ring is the same as described above with reference to structures of the single energizing type.

It will be understood, of course, that the brake ring 191 is free to float on the studs 189 within the confines of the brake discs 194 and as in various other embodiments above discussed the brake ring is prevented from escaping axially outward by the presence of the outer brake disc. As a further precaution, however, against such escape as in the event of the severance of the bolts 197, the studs 189 are extended beyond the eyes 190 and are provided with a detachable stop 208 preferably in the form of a nut locked against loosening or displacement and located to allow full freedom of the ring 190 to float within the limits of movement of the brake ring 191 during ordinary operation, but also limited to prevent excessive outward axial movement should the brake unit become detached from the hub 180, as by the severance of bolts 197. Obviously, the precautionary use of the nut or stop 208 is available for all of the other structures above described.

In Figure 33 is shown fragmentarily a splay type of single energizing brake wherein the parts are identical with those just described with respect to Figure 32, except that the brake ring 191' is shown as having but a single inclined face, and except that there is no inner brake disc and the energizing plate 200' is held by studs similar to the studs 198, but anchored in the pivoted hub in the absence of an inner brake disc. The same reference numerals apply to the other parts in Figure 32, and the same description is equally applicable to such other parts in Figure 33. The braking operation in the structure seen in Figure 33 will be the same as that of the structure of Figure 32, except for the omission of the resistance incident to the presence of the inner braking surface. This construction, of course, is preferably for use where the load is lighter than for such structures as seen in Figure 32 and in other figures of the drawings.

In Figures 34 and 35 is shown the brake disc 209, which is the outer brake disc where two brake discs are employed, and in this structure the energizing element does not assume the form of a lever but that of a cam. To this end, bolts or studs 210 are fixed either to the inner brake disc or to some other non-rotating part, such as a fixed hub or swiveled hub, and extend outward through openings 211 formed in the brake disc 209 and sufficiently larger in diameter than the studs 210 to allow some rotative or angular movement of the brake disc 209 independently of the studs 210. Each stud 210 has at its outer end a nut 212 which retains a frusto-conical annulus 213 against outward movement, and the conical portion of each annulus 213 is seated in the flaring portion 214 of the wall of the respective aperture 211 of brake disc 209. Thus, when the disc 209 moves angularly or in a rotative direction, it must do so by having the inclined faces 214 ride across the inclined faces of the frusto-conical annuli 213. Thus, the several annuli 213 cam the disc 209 axially into tighter contact with the brake ring than that of its initial engagement under the impulse of the prime actuator. The prime actuator may assume any of the various forms illustrated in the figures above described, or may be simply the nut on the end of a bolt extending through a central aperture 215 formed through the disc 209. The connections enabling a pull to be exerted on such a bolt may be such as those disclosed in my Patent No. 1,831,125, dated November 10, 1931, and the bolt may assume the form of bolt 76 of said patent.

In the several embodiments shown in the figures of the drawings above described, the prime actuator consisting essentially of the thrust impulse rod 33 or its equivalent and connected parts acts through the brake disc or discs, and the rod, therefore, requires a circumferential slot in the brake disc or brake discs, as the case may be, to allow for the rotative movement thereof while the energizers are forcing the brake disc or brake discs to a more firmly seated engagement with the brake ring. This, however, is merely a matter of convenience of assemblage and obviously the prime actuator may be located at one side or the other without penetrating the brake disc or brake discs, so that the slot to accommodate rotative movement of such disc or discs is not required. An embodiment of the invention with the prime actuator arranged not to penetrate the brake discs is seen in Figure 38 wherein the parts are identical with those seen in Figure 2 except for the arrangement of the prime actuator. The same description of all the other parts as given with respect to Figure 2 is equally applicable, but, for purpose of definite identification, the corresponding parts are given corresponding numbers with an *a* power. The fixed hub is 6a carrying the inner energizing plate 12a rigidly connected to the hub and having the flange 13a surrounded by the brake disc 16a cooperating with the brake ring 28a. The disc 16a is stressed out of contact with ring 28a by the spring 26a. A rod 33a extends through the energizing plate 12a and is provided with a head or contact plate 35a located to engage the inner face of the brake disc 16a and to impart a lateral thrust thereto effecting the initial frictional engagement thereof with ring 28a. The brake disc 16a is thereupon energized to a more intimate frictional contact by the energizing rollers interposed between disc 16a and energizing plate 12a, but not seen in Figure 38. The longitudinal thrust may be imparted to the rod 33a in any appropriate and effective manner, as by having the rod provided with a cam or high pitched thread 33b engaging a corresponding cam or internal thread in the plate 12a, so that, when the rod 33a is rocked, it will be cammed longitudinally. An operating arm 41a is connected to the rod 33a to oscillate the same and cause the cam 33b to thrust the rod longitudinally toward and away from the disc 16a, as required.

It is plain from the foregoing that when power is transmitted as from a rotor or rotating brake ring to a stator or non-rotating brake disc, the desideratum is absorption or damping of the power, but, of course, a reversal of the parts or of the action of the parts is obviously available, as where the stator is intended to be rotated by the rotor in the transmission of power, as, for example, in a structure embodying the invention in the form of a clutch.

It will be plain from the foregoing that in operation the prime actuator maintains at all times a perfect, effective, and balanced control to insure the extent and timing of a power application of the brake, which power application is secured through the momentum of the rotor or revolving brake ring and the parts actuated incident to the frictional engagement therewith of the brake disc or brake discs. The rod 33 or its equivalent in any of the embodiments is a thrust-impulse rod which locates the parts to provide a preliminary or prime actuation. This provides initial friction which is immediately supplemented by the increased friction incident to the power impulse or axial movement given to the respective brake disc by its energizers, and the power application of the brake discs continues to increase until either the maximum is achieved and expressed in the form of stopping the movement of the brake ring or until the prime actuator is relaxed. It is obvious that the prime actuator must first overcome the resilient stress tending to separate the respective brake disc from its brake ring before any application is made, and that this resilient stress, such as exerted by spring 26, must continue to be overcome by the prime actuator during the whole time of the power application of the brake disc, since the moment the spring 26 is released to move the brake disc out of frictional engagement with the brake ring, that moment the engagement under the momentum of the brake ring acting through the energizing rollers, blocks or equivalents relaxes. Hence, in operation, the actuation of the prime actuator is the governing means by which both the extent and timing of the power application of the brake is controlled. By this means, a very slight pressure on the brake pedal or other apparatus for operating the prime actuator effects a substantial application of the brake considerably in excess of the power expended by the operator, but at the same time the actual amount of power supplied is effectively controlled, as by not allowing the brake disc to move into full and complete frictional engagement with the brake ring, or by relaxing and allowing the brake disc to partially back off after a more nearly complete application. Of course, if the operator makes the mistake of putting all of his available force onto the prime actuator, the frictional grip between the brake ring and brake disc will immediately be such as to give a maximum power application, and the momentum of the brake ring will carry the brake disc far enough to cause the energizing elements to create such friction between the brake disc and the brake ring as to bring the parts to an almost instant standstill or almost instantly locked condition. This, of course, will naturally be avoided except in extreme emergency, and in ordinary use the prime actuator will be caused to overcome the pressure of the spring 26 or its equivalent only to the extent needed for the braking force required under the particular circumstance, and this braking force is susceptible of control with absolute nicety of precision, assuring the stopping of the motion of the wheel with maximum speed accompanied with minimum shock.

The prime actuators of the several wheels of an automobile will ordinarily be connected to a single brake lever. The power transmission device embodying the present invention, when otherwise applied than to automobile wheels, will preferably have some equivalent control comparable with such a brake lever, and such control is considered manual without regard to what part of the anatomy of the operator is employed for manipulating such control, and also without regard to any interposition of other apparatus for the operation of such control.

While it is true that the brake disc or brake discs is or are actually bodily shifted toward the brake ring by the energizers, and shifted away from the brake ring by the interposed spring, such movement (as is well known to those familiar with the art) is very slight indeed, being just sufficient on the one hand to afford the requisite frictional engagement, and, on the other hand, to release such engagement and free the brake ring from frictional contact. Of course, the several energizing elements, whether in the form of rollers, blocks, cams or wedges, will necessarily have a moment of looseness at the time of first application of the prime actuator, since the movement of the respective brake disc away from the corresponding energizing plate will increase the clearance therebetween, but such increase is in actual operation very slight indeed, and is almost instantly taken up so that no appreciable play occurs and none is allowed to continue. It should be noted that the blocks 24' have a rocking or rolling motion while the rollers 24 literally roll in their engagement against the opposing inclined surfaces, and either the interposition of the bulk of the rollers in the otherwise narrowing space incident to the inclined planes or the interposition of the diagonals of the blocks effects a leverage action creating a relative spreading of the space between the respective energizing plate and its corresponding brake disc. This same result is secured by a wedging or camming action where such embodiment as seen in Figures 34 and 35 is employed.

The initial actuator, whether of the form seen in Figure 2, or of any other form disclosed, is in each instance structurally independent of the energizers through which the brake discs are thrust into greater or more nearly perfect frictional contact with the brake ring, when the brake discs receive rotative movement from the brake ring. The relation of the initial actuator to the energizers is cooperative and such as to facilitate following through by the initial actuator of the movements of the brake disc under the impulse of the energizers so as to keep the expansion spring from releasing the brake disc.

Brakes embodying the present invention are, according to the present invention, well adapted to include and apply the principles of the external location of brakes relative to wheel bodies, as set forth in my Patents Nos. 1,831,125, dated November 10, 1931; 1,922,307, dated August 15, 1933; 1,922,962, dated August 15, 1933, and 1,938,030, dated December 5, 1933. This external location is exemplified in such structures as seen in Figures 18, 25, 31 and 32 of the drawings herein.

What is claimed is:—

1. The combination of power transmission elements mounted to have rotative movement, one of which is adapted to be power rotated, and the other of which is adapted to move toward and away from the first for frictional engagement therebetween for the transmission of power, a relatively fixed plate located adjacent to the power transmission element that is movable toward and away from the other, the plate being provided with a recess facing toward the adjacent power transmission element, and the last-named element being provided with a recess facing toward the plate and cooperating with the recess thereof to form a pocket therebetween, and a block energizer in said pocket unattached to either the fixed plate or the adjacent power transmission element and retained against dislocation by the walls of the recesses, the energizer being tiltable within the pocket for presenting increasing dimensions of the block between the walls of the respective recesses comprising the pocket, whereby to increase the spacing between the fixed plate and the last-named power transmission element for imparting movement to the latter toward the other power transmission element.

2. The combination of power transmission elements adapted by engagement to transmit power from one to the other, one of said elements being slidably mounted to move bodily towards and away from the other element, and being apertured, and means actuated by power transmitted between the power transmission elements for sliding the slidably mounted power transmission element in the direction of engagement, the said means being located to limit the extent of possible movement of said slidably mounted power transmission element, and said means including an actuator extending through the aperture in said last-named element.

3. In a brake device of the class described, a pair of spaced energizing plates, spaced braking elements disposed intermediate said energizing plates and mounted for rotary movement, and for lateral movement toward and away from each other, a rotary element to be braked rotatably mounted between said braking elements, means extending through said braking elements for simultaneously moving the same laterally into frictional contact with said rotary element, and means disposed between each of said plates and the adjacent braking element automatically operable by said relative rotary movement of said braking elements to cause further lateral movement of said braking elements towards each other to effect braking engagement with said rotary element.

4. In a brake device of the class described, a pair of spaced energizing plates, spaced braking elements disposed intermediate said energizing plates, said plates being mounted for rotary movement, and for lateral movement towards and from each other, a rotary element to be braked disposed intermediate said braking elements and mounted for free rotation therebetween, said energizing plates and said braking elements being formed with opposing cam recesses, unattached roller members disposed within said recesses for forcing said braking elements away from said energizing plates and towards each other upon rotary movement of said braking elements, and separate means for urging the braking elements into frictional engagement with said rotary element to effect the aforesaid relative rotary movement of said braking elements.

5. In a brake device, a pair of spaced braking elements, a rotary element to be braked rotatably disposed between said braking elements, a pair of spaced, stationary energizing plates located adjacent said braking elements, cam means between said energizing plates and braking elements operable upon rotary movement of said braking elements to cause braking engagement between said braking elements and said rotary element, and means for moving said braking elements towards each other into frictional engagement with said rotary element to produce said rotary movement of said braking elements.

6. In a brake device, a pair of spaced braking elements, a rotary element to be braked rotatably disposed between said braking elements, a pair of spaced, stationary energizing plates located adjacent said braking elements, cam means between said energizing plates and braking elements operable upon rotary movement of said braking elements to cause braking engagement between said braking elements and said rotary element, and means for moving said braking elements towards each other into frictional engagement with said rotary element to produce said rotary movement of said braking elements, comprising an actuating member extending through said energizing plates and said braking elements to produce clamping action of said parts.

7. In a brake device, a pair of spaced braking elements, a rotary element to be braked rotatably disposed between said braking elements, a pair of spaced, stationary energizing plates located adjacent said braking elements, cam means between said energizing plates and braking elements operable upon rotary movement of said braking elements to cause braking engagement between said braking elements and said rotary element, and means for moving said braking elements toward each other into frictional engagement with said rotary element to produce said rotary movement of said braking elements, comprising an actuating member extending through said energizing plates and said braking elements to produce clamping action of said parts, said braking elements being constructed to cooperate with the actuating member to limit relative rotary movement of the braking elements.

8. The combination of power transmission elements adapted by engagement therebetween to transmit power from one to the other, one of said elements being slidably mounted to move bodily towards and away from the other element, and means actuated by power transmitted between the power transmission elements for sliding the slidably mounted power transmission element in the direction of engagement, means for limiting movement of the slidably mounted element, the said slidably mounted transmission element being so constructed and located relative to the limiting means as to limit the extent of possible movement of said slidably mounted transmission element as aforesaid, said slidably mounted power transmission element being apertured, and manually operable means extending through the aperture in the last-mentioned power transmission element for imparting initial movement to the slidably mounted transmission element.

9. The combination of power transmission elements mounted to have rotative movement, one of which is adapted to be power rotated, and the other of which is adapted to move towards and away from the first for frictional engagement therebetween for the transmission of power, a relatively fixed plate located adjacent to the power transmission element that is movable towards and away from the other, the plate being provided with a recess facing towards the adjacent power transmission element, and the last-mentioned element being provided with a recess facing towards the plate and cooperating with the recess thereof to form a pocket therebetween, and a block energizer in said pocket unattached to either the fixed plate or the adjacent power transmission element and retained against dislocation by the walls of the recesses, the energizer being tiltable within the pocket for increasing the spacing between the fixed plate and the last-mentioned power transmission element for imparting movement to the latter towards the other power transmission element.

10. In a brake device, a pair of spaced energizing plates, a pair of braking discs disposed intermediate said plates, cam means between each of said plates and discs for forcing the discs towards each other upon relative rotative movement thereof with respect to said plates, a rotary member to be braked mounted for rotary movement between said discs, clamping means extending through said discs and engaging the outer faces thereof for moving said discs towards each other to cause frictional engagement thereof with said rotary element to effect the relative rotary movement aforesaid of said discs, and guide means on one of said plates for supporting said clamping means.

11. In a brake device of the class described, a pair of spaced energizing plates, spaced braking elements disposed intermediate said energizing plates, means for mounting said plates for parallel rotary movement, and for lateral movement towards and away from each other, a rotary element to be braked disposed intermediate said braking elements, said energizing plates and said braking elements having therein cam recesses, an unattached roller disposed in each of said recesses cooperating with said cam surfaces for forcing said braking elements away from said energizing plates and towards each other upon relative rotary movement, and separate means for urging the braking elements into frictional contact with said rotary element to effect the aforesaid relative rotary movement of the braking elements.

12. In a brake device of the class described, a pair of spaced energizing plates, spaced braking elements disposed intermediate said energizing plates. means for mounting said plates for parallel rotary movement, and for lateral movement towards and away from each other, a rotary element to be braked disposed intermediate said braking elements, said energizing plates and said braking elements having formed therein cam recesses, an unattached roller disposed in each of said recesses cooperating with said cam surfaces for forcing said braking elements away from said energizing plates and towards each other upon relative rotary movement, guide means on said plates, and separate actuating means operative in said guide means for urging the braking elements into frictional contact with said rotary element to effect the aforesaid relative rotary movement of the braking elements, said separate means extending through said braking elements and constituting means to limit the maximum relative rotation of said braking elements.

13. In a device of the class described, a support, a pair of spaced energizing plates thereon, a pair of braking discs disposed on said support in spaced relation and intermediate said plates, spring means between the discs for urging said discs away from each other, cam means between each of said discs and the adjacent energizing plate automatically operable upon relative rotation between said discs and plates for forcing said discs towards each other, a rotary member mounted between said discs for rotation and adapted to be braked by said discs, and means carried by one of said plates for uniformly urging said discs into frictional contact with said rotary member to cause the aforesaid relative rotation of the discs.

14. In a brake device of the class described, a support, an energizing plate secured thereto, a pair of spaced brake discs mounted on said support, one of said discs being mounted for rotary and lateral movements, cam means between said plate and the last-mentioned disc for automatically causing lateral movement of said disc upon relative rotary movement thereof, a rotary member to be braked mounted on said support between said discs for rotary and lateral shifting movements, separate clamping means for urging one of said discs towards the other and into frictional engagement with said rotary element to effect the aforesaid rotary movement of the laterally movable disc, said clamping means extending through said discs for exterior engagement therewith, and means on one of said plates for guiding and supporting said clamping means.

15. In a device of the class described, a pair of energizer members adapted to be fixedly mounted on a support in laterally spaced relation to each other, a rigid member rotatably mounted and constituting a member to be braked, said rigid member being laterally shiftable, a pair of laterally movable braking members disposed intermediate the members and respectively at opposite sides of said member to be braked, and adapted to have frictional engagement therewith, said braking members also being free to rotate relatively to said energizer members for at least a partial turn, means for imparting lateral movement to said braking members, and means interposed between each of said energizer members and the adjacent braking member automatically operable by relative rotary movement of said braking members respecting the energizer members to cause further lateral movement of said braking members so as to frictionally engage the same with the rigid member to be braked, whereby to produce a braking action on the latter.

16. In a device of the class described, a rotary member to be braked, said rotary member including a rigid part mounted for bodily movement laterally, a pair of braking members mounted one at each side of said rigid laterally movable part and adapted for frictional engagement therewith, at least one of said braking members being laterally movable and also rotatable, an energizer member adjacent to said laterally movable braking member, means for thrusting said laterally movable braking member into frictional engagement with the rigid part to be braked, whereby to produce a relative rotatable movement between the braking member and its associated energizer member, means interposed between the laterally movable braking member and its associated energizer member automatically operable by relative rotary movement thereof to cause further lateral movement of said laterally movable braking member so as to frictionally engage both braking members with the rigid part to be braked, whereby to produce a braking action on the rotary member, means for normally urging the laterally movable braking member away from the other braking member so as to maintain the said braking members out of braking engagement with the rotary part of the rotary member to be braked, and adjustable means for limiting the spacing apart of said braking elements under the influence of the means tending to space the same apart.

17. In a device of the class described, a rotary member to be braked, said rotary member including a rigid part mounted for bodily movement laterally, a pair of braking members mounted one at each side of said rigid laterally movable part and adapted for frictional engagement therewith, at least one of said braking members being laterally movable and also rotatable, an energizer member adjacent to said laterally movable braking member, means for thrusting said laterally movable braking member into frictional engagement with the rigid part to be braked, whereby to produce a relative rotatable movement between the braking member and its associated energizer member, means interposed between the laterally movable braking member and its associated energizer member automatically operable by relative rotary movement thereof to cause further lateral movement of said laterally movable braking member so as to frictionally engage both braking members with the rigid part to be braked, whereby to produce a braking action on the rotary member, means for normally urging the laterally movable braking member away from the other braking member so as to maintain the said braking members out of braking engagement with the rotary part of the rotary member to be braked, and adjustable means for limiting the spacing apart of said braking elements under the influence of the means tending to space the same apart, said adjustable means including a plurality of tie-bolts extending through the braking members and arranged in uniformly spaced relation to each other.

18. In a device of the class described, a rotary member to be braked, said rotary member including a rigid part to which the braking action is adapted to be imparted, a braking member mounted at one side of said rigid part and adapted for frictional engagement therewith, said braking member being laterally movable towards and away from said rigid part, and also being rotatable, an energizer member adjacent to said laterally movable braking member, means actuable from a position at the side of the rigid part opposite to the side at which the braking and energizer members are positioned, and acting upon the side of the braking member opposite to the rigid part engaging side, for drawing the braking member laterally towards the rigid part and into frictional engagement therewith, whereby to produce a relative rotary movement between the braking member and the energizer member, and means interposed between the braking member and the energizer member automatically operable by the relative movement aforesaid to cause further lateral movement of said braking member towards the rigid part, whereby to produce a braking action on the rigid part of the rotary member.

19. In a device of the class described, a rotary member to be braked, said rotary member including a rigid part to which the braking action is adapted to be imparted, a braking member mounted at one side of said rigid part and adapted for frictional engagement therewith, said braking member being laterally movable towards and away from said rigid part, and also being rotatable, an energizer member adjacent to said laterally movable braking member, means actuatable from a position at the side of the rigid part opposite to the side at which the braking and energizer members are positioned and extending through said braking member and adapted to act upon the side of the braking member opposite to the rigid part engaging side, for drawing the braking member laterally towards the rigid part and into frictional engagement therewith, whereby to produce a relative rotary movement between the braking member and the energizer member, and means interposed between the braking member and the energizer member automatically operable by the relative movement aforesaid to cause further lateral movement of said braking member towards the rigid part, whereby to produce a braking action on the rigid part of the rotary member.

20. In a brake device of the class described, a support, tie bolts carried by said support, a rotary member to be braked associated with said support, an energizer plate carried by the tie bolts, a brake disc disposed between said member to be braked and the energizer plate and having openings through which said tie bolts extend, said openings being of sufficient size to permit axial and limited angular movement of the brake disc, said energizer plate and brake disc having opposing cam surfaces facing each other, a plurality of energizing rollers freely mounted between the camming surfaces aforesaid, and means for shifting the brake disc axially into contact with the rotary member to be braked, said brake disc being actuated into braking engagement with the rotary member by said energizing rollers in the angular movement of the brake disc.

HOMER T. LAMBERT.

DISCLAIMER 2,063,443.—*Homer T. Lambert*, St. Joseph, Mich. BRAKE MECHANISM. Patent dated December 8, 1936. Disclaimer filed October 7, 1942, by the inventor; the assignee, *The Lambert Brake Corporation*, consenting.

Hereby enters this disclaimer to claim 2 of said patent.

[*Official Gazette November 3, 1942.*]